US012508705B2

(12) United States Patent
Nishi et al.

(10) Patent No.: US 12,508,705 B2
(45) Date of Patent: Dec. 30, 2025

(54) INSPECTION ROUTE GENERATION DEVICE AND INSPECTION ROUTE GENERATION METHOD

(71) Applicant: Hitachi Astemo, Ltd., Hitachinaka (JP)

(72) Inventors: Kaichiro Nishi, Tokyo (JP); Nobuaki Nakasu, Tokyo (JP); Hiroki Morii, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 275 days.

(21) Appl. No.: 18/265,276

(22) PCT Filed: Dec. 1, 2021

(86) PCT No.: PCT/JP2021/044041
§ 371 (c)(1),
(2) Date: Jun. 5, 2023

(87) PCT Pub. No.: WO2022/124152
PCT Pub. Date: Jun. 16, 2022

(65) Prior Publication Data

US 2024/0042607 A1 Feb. 8, 2024

(30) Foreign Application Priority Data

Dec. 11, 2020 (JP) ................................. 2020-206099

(51) Int. Cl.
*B25J 9/16* (2006.01)
*B25J 19/02* (2006.01)
(Continued)

(52) U.S. Cl.
CPC ........... *B25J 9/1664* (2013.01); *B25J 19/023* (2013.01); *G06T 7/0004* (2013.01); *H04N 23/60* (2023.01)

(58) Field of Classification Search
CPC ...... B25J 19/023; B25J 9/1664; B25J 9/1697; G06T 7/0002; G06T 7/0004; G01N 21/95;
(Continued)

(56) References Cited

U.S. PATENT DOCUMENTS 5,633,717 A 5/1997 Baldur
2017/0203446 A1* 7/2017 Dooley ................ H04N 23/631
(Continued)

FOREIGN PATENT DOCUMENTS

JP 2013-082049 A 5/2013
JP 2016-224547 A 12/2016
(Continued)

OTHER PUBLICATIONS

International Search Report with English Translation and Written Opinion, PCT/JP2021/044041, Feb. 15, 2022, 10 pgs.
(Continued)

*Primary Examiner* — Adam R Mott
*Assistant Examiner* — James Miller Watts, III
(74) *Attorney, Agent, or Firm* — Volpe Koenig

(57) ABSTRACT

An inspection route generation device generates an inspection route of an external appearance inspection device which performs external appearance inspection on an inspection target based on an image imaged by an imaging unit, and includes: a storage unit which stores inspection position information indicating a plurality of inspection positions at which the imaging unit images the inspection target, and inspection device configuration information indicating a configuration of the external appearance inspection device; and a route determination unit which calculates a route length between respective inspection positions, and a posture change amount of the imaging unit at a time when the imaging unit moves through the plurality of inspection
(Continued)

positions, based on the inspection position information and the inspection device configuration information, and determines the inspection route based on the calculated route length and posture change amount.

14 Claims, 16 Drawing Sheets

(51) Int. Cl.
*G06T 7/00* (2017.01)
*H04N 23/60* (2023.01)

(58) Field of Classification Search
CPC .......... G01N 21/9515; G01N 21/8851; G01N 21/88; G01N 21/8887; G01N 2021/9518; G01B 11/00; G05B 2219/45066; G05B 2219/40463; G05B 2219/40562; G05B 2219/40565; G05B 2219/40613; G05B 2219/37206; G05B 2219/37208; G05B 2219/37449; H04N 23/60
See application file for complete search history.

(56) References Cited

U.S. PATENT DOCUMENTS

| | | | | |
|---|---|---|---|---|
| 2018/0370027 | A1 | 12/2018 | Oota et al. | |
| 2019/0120771 | A1 | 4/2019 | Oota et al. | |
| 2019/0279354 | A1* | 9/2019 | Inazumi | G06T 7/0004 |
| 2019/0281213 | A1* | 9/2019 | Kato | B25J 9/1664 |
| 2020/0061824 | A1* | 2/2020 | Pholsiri | B25J 9/1666 |

FOREIGN PATENT DOCUMENTS

| | | | |
|---|---|---|---|
| JP | 2016-224707 | A | 12/2016 |
| JP | 2017-203744 | A | 11/2017 |
| JP | 2019-007891 | A | 1/2019 |
| JP | 2019-078651 | A | 5/2019 |
| JP | 2019-158499 | A | 9/2019 |
| JP | 2020-099215 | A | 7/2020 |

OTHER PUBLICATIONS

Japanese Office Action issued on Oct. 29, 2024 for Japanese Patent Application No. 2020-206099.
Extended European Search Report issued on Oct. 11, 2024 for European Patent Application No. 21903256.2.

* cited by examiner

FIG. 2

ROBOT CONFIGURATION INFORMATION 1310

101 102 103

| # | CATEGORY | ITEM | CONTENTS |
|---|---|---|---|
| 0 | Robot | Robot NAME | RoboA |
| 1 | Link0 | SHAPE FILE | Base.stl |
| 2 | Link1 | SHAPE FILE | Link1.stl |
| 3 | Link2 | SHAPE FILE | Link2.stl |
| ... | ... | ... | ... |
| 10 | Joint0 | PARENT LINK | Link0 |
| | | CHILD LINK | Link1 |
| | | JOINT TYPE | Revolute |
| | | JOINT ANGLE LOWER LIMIT | -180 |
| | | JOINT ANGLE UPPER LIMIT | +180 |
| | | JOINT SPEED UPPER LIMIT | 4.0 |
| 11 | Joint1 | PARENT LINK | Link1 |
| | | CHILD LINK | Link2 |
| | | JOINT TYPE | Revolute |
| | | JOINT ANGLE LOWER LIMIT | -160 |
| | | JOINT ANGLE UPPER LIMIT | +160 |
| | | JOINT SPEED UPPER LIMIT | 6.0 |
| ... | ... | ... | ... |

FIG. 3

INSPECTION EQUIPMENT CONFIGURATION INFORMATION 1311

| # | EQUIPMENT NAME (111) | ATTACHMENT TARGET (112) | RELATIVE POSITION (113) | RELATIVE POSTURE (114) |
|---|---|---|---|---|
| 0 | INSPECTION BASE | Root | (0,0,0) | (0,0,0) |
| 1 | RobotA | INSPECTION BASE | (100,100,0) | (0,90,0) |
| 2 | CAMERA | RobotA-Link6 | (0,0,0) | (0,0,90) |
| 3 | PART A | INSPECTION BASE | (0,0,0) | (0,0,0) |
| ... | ... | ... | ... | ... |

FIG. 4

INSPECTION TARGET AREA INFORMATION 1321

211 212 213 214 215 216 217 218

| # | F1 | F2 | F3 | F4 | F5 | ... | Fn-1 | Fn |
|---|---|---|---|---|---|---|---|---|
| PART A | 0 | 0 | 0 | 1 | 1 | ... | - | - |
| PART B | 1 | 1 | 1 | 1 | 1 | ... | 1 | - |
| PART C | 1 | 0 | 0 | 1 | 1 | ... | 0 | 1 |

FIG. 5

INSPECTION CONDITION INFORMATION 133

1330 1331 1332

| | INSPECTION POSITION INFORMATION | | | | | | INSPECTABLE AREA INFORMATION | | | | | | | CAMERA MOVABLE RANGE INFORMATION | |
|---|---|---|---|---|---|---|---|---|---|---|---|---|---|---|---|
| # | Px | Py | Pz | nx | ny | nz | F1 | F2 | F3 | F4 | F5 | ... | Fn | CYmin | CYmax |
| A | 0.5 | 0.1 | 1.1 | 0.000 | 0.940 | 0.342 | 0 | 0 | 0 | 1 | 1 | ... | 1 | 30 | 200 |
| B | 0.6 | 0.1 | 1.6 | 0.171 | 0.940 | 0.296 | 0 | 0 | 0 | 1 | 1 | ... | 0 | 20 | 180 |
| C | 0.7 | 0.3 | 2.2 | 0.000 | 0.996 | 0.087 | 0 | 1 | 1 | 1 | 0 | ... | 0 | 170 | 300 |
| D | 0.8 | 0.3 | 2.8 | 0.044 | 0.996 | 0.076 | 0 | 1 | 1 | 1 | 0 | ... | 0 | 10 | 180 |
| E | 0.4 | 0.5 | 1.5 | 0.000 | 1.000 | 0.000 | 1 | 1 | 1 | 1 | 0 | ... | 0 | 185 | 360 |
| ... | ... | ... | ... | ... | ... | ... | ... | ... | ... | ... | ... | ... | ... | ... | ... |
| L | 0.5 | 0.2 | 1.2 | 0.000 | 1.000 | 0.000 | 0 | 1 | 1 | 0 | 1 | ... | 1 | - | - |
| ... | ... | ... | ... | ... | ... | ... | ... | ... | ... | ... | ... | ... | ... | ... | ... |
| 301 | 302 | 303 | 304 | 305 | 306 | 307 | 311 | 312 | 313 | 314 | 315 | | 316 | 321 | 322 |

INTER-NODE CONNECTION INFORMATION 1340

MOVEMENT COST INFORMATION 1341

422

411

| | | END POINT | | | | | |
|---|---|---|---|---|---|---|---|
| | | A | B | C | D | E | ... |
| START POINT | A | - | 0.1 | 1.1 | 2.0 | - | ... |
| | B | 0.5 | - | - | 3.1 | 0.1 | ... |
| | C | - | 0.3 | - | 2.5 | 0.1 | ... |
| | D | 0.6 | 0.4 | 2.2 | - | 0.2 | ... |
| | E | - | 0.5 | 1.5 | 0.2 | - | ... |
| | ... | ... | ... | ... | ... | ... | ... |

FIG. 8

OUTPUT INFORMATION 135

| | INSPECTION ROUTE INFORMATION (1350) | | | | | | CAMERA ANGLE INFORMATION (1351) | ROBOT POSTURE INFORMATION (1352) | | | | | |
|---|---|---|---|---|---|---|---|---|---|---|---|---|---|
| # (501) | Px (502) | Py (503) | Pz (504) | nx (505) | ny (506) | nz (507) | CY (511) | J1 (521) | J2 (522) | J3 (523) | J4 (524) | ... | Jn (525) |
| D | 0.8 | 0.3 | 2.8 | 0.044 | 0.996 | 0.076 | 180 | 0.10 | 0.00 | 1.05 | 2.00 | ... | 3.3 |
| C | 0.7 | 0.3 | 2.2 | 0.000 | 0.996 | 0.087 | 180 | 0.15 | 0.1 | 2.01 | 2.01 | ... | 3.2 |
| B | 0.6 | 0.1 | 1.6 | 0.171 | 0.940 | 0.296 | 180 | 0.15 | 0.2 | 2.05 | 1.00 | ... | 3.1 |
| A | 0.5 | 0.1 | 1.1 | 0.000 | 0.940 | 0.342 | 180 | 0.20 | 0.3 | 1.50 | 1.04 | ... | 3.2 |
| E | 0.4 | 0.5 | 1.5 | 0.000 | 1.000 | 0.000 | 185 | 0.30 | 0.4 | 1.60 | 1.05 | ... | 3.3 |
| F | 0.2 | 0.5 | 0.5 | 0.171 | 0.940 | 0.296 | 180 | 0.40 | 0.4 | 2.60 | 1.05 | ... | 3.3 |
| G | 0.1 | 0.6 | 1.3 | 0.342 | 0.940 | 0.000 | 180 | 0.50 | 0.4 | 2.30 | 1.05 | ... | 3.3 |

INSPECTION ROUTE GENERATION DEVICE AND INSPECTION ROUTE GENERATION METHOD

TECHNICAL FIELD

The present invention relates to a device and a method which generate an inspection route at a time when an external appearance inspection device which performs external appearance inspection on an inspection target moves through a plurality of inspection positions.

BACKGROUND ART

As the background art related to the present invention, a technique of following PTL 1 is known. PTL 1 discloses an inspection system which includes a movement mechanism which moves an inspection target to image a plurality of imaging areas set on an inspection plane, and can more smoothly image the inspection target in the plurality of imaging areas (inspection areas) since a movement trajectory of the imaging area on the inspection plane includes a section which moves around a center of gravity of the inspection target.

CITATION LIST

Patent Literature

PTL 1: JP 2016-224707 A

SUMMARY OF INVENTION

Technical Problem

The inspection system disclosed in PTL 1 sets a spiral movement trajectory which moves around the center of gravity of the inspection target, and images and inspects the inspection target in a plurality of inspection areas on this movement trajectory to minimize a movement amount between the inspection areas and reduce an inspection time. However, a method of PTL 1 does not take a posture of a camera at a time of imaging into account. Therefore, in a case where a defect existing in an inspection target is imaged in a plurality of inspection areas, a position of this defect on the captured images also changes spirally in response to a motion of the camera. As described above, in a case where a camera images the same face of an inspection target from a plurality of viewpoints to perform external appearance inspection, there is a problem that a posture change of the camera is great according to the conventional technique, and therefore a position change of a defect of the inspection target on the captured images becomes great, and, as a result, inspection accuracy lowers.

It is therefore a main object of the present invention is to provide an inspection route which makes it possible to reduce an inspection time while suppressing a decrease in inspection accuracy for an external appearance inspection device which performs external appearance inspection on an inspection target.

Solution to Problem

An inspection route generation device according to the present invention generates an inspection route of an external appearance inspection device which performs external appearance inspection on an inspection target based on an image imaged by an imaging unit, and includes: a storage unit which stores inspection position information indicating a plurality of inspection positions at which the imaging unit images the inspection target, and inspection device configuration information indicating a configuration of the external appearance inspection device; and a route determination unit which calculates a route length between respective inspection positions, and a posture change amount of the imaging unit at a time when the imaging unit moves through the plurality of inspection positions, based on the inspection position information and the inspection device configuration information, and determines the inspection route based on the calculated route length and posture change amount.

An inspection route generation method according to the present invention generates an inspection route of an external appearance inspection device which performs external appearance inspection on an inspection target based on an image imaged by an imaging unit, and includes executing at a computation device: processing of acquiring inspection position information indicating a plurality of inspection positions at which the imaging unit images the inspection target, and inspection device configuration information indicating a configuration of the external appearance inspection device; processing of calculating a route length between respective inspection positions, and a posture change amount of the imaging unit at a time when the imaging unit moves through the plurality of inspection positions, based on the acquired inspection position information and inspection device configuration information; and processing of determining the inspection route based on the calculated route length and posture change amount.

Advantageous Effects of Invention

According to the present invention, it is possible to provide an inspection route which makes it possible to reduce an inspection time while suppressing a decrease in inspection accuracy for an external appearance inspection device which performs external appearance inspection on an inspection target.

Problems, configurations, and effects other than the above problem, configuration, and effect will be made apparent from the following embodiments.

BRIEF DESCRIPTION OF DRAWINGS

FIG. 2 is a diagram illustrating an example of data of robot configuration information.

FIG. 3 is a diagram illustrating an example of data of inspection equipment configuration information.

FIG. 4 is a diagram illustrating an example of data of inspection target area information.

FIG. 5 is a diagram illustrating an example of data of inspection condition information.

FIG. 8 is a diagram illustrating an example of data of output information.

DESCRIPTION OF EMBODIMENTS

Figure 1:
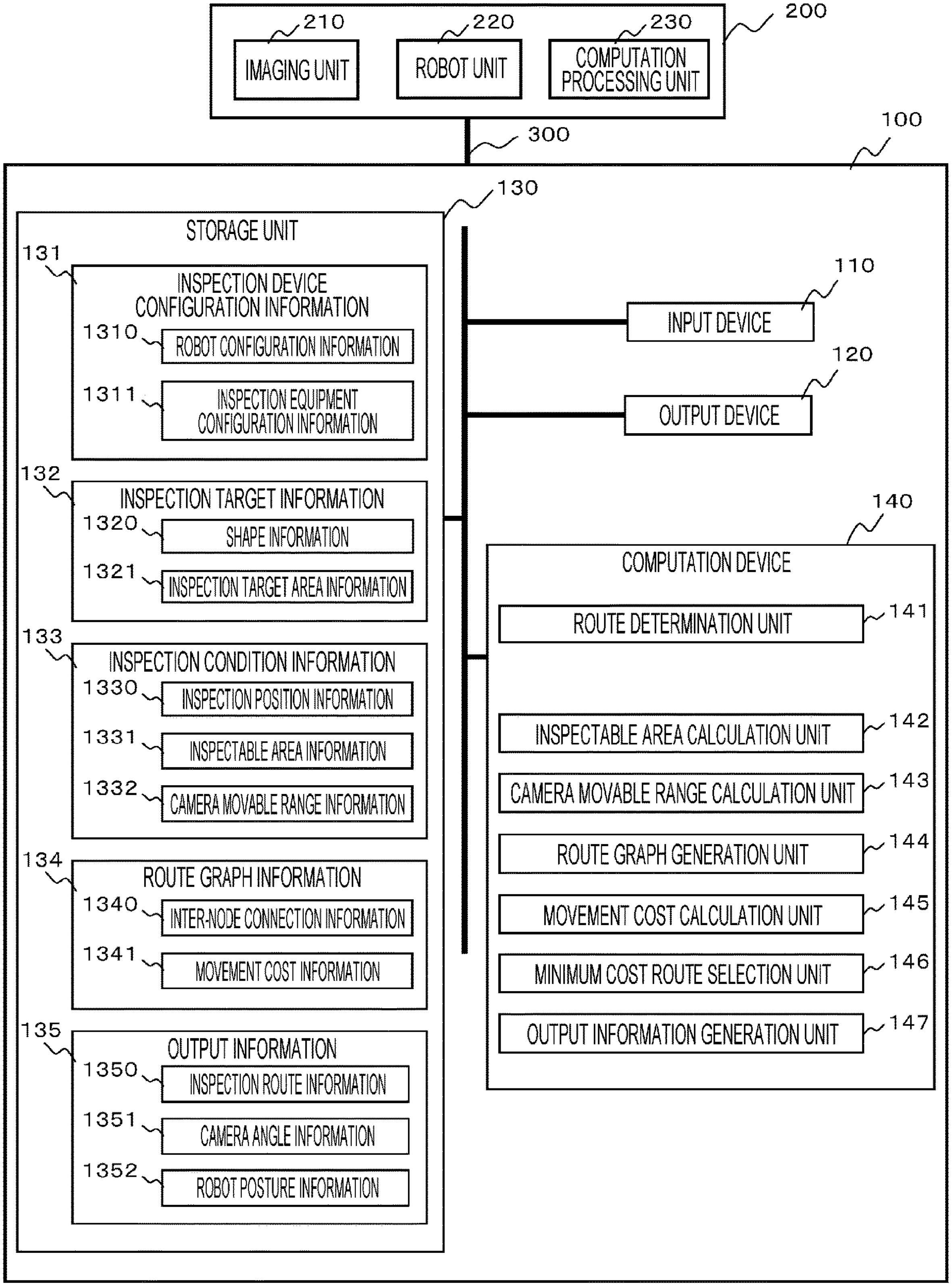
FIG. 1 is a diagram illustrating a configuration example of an external appearance inspection system which includes an inspection route generation device according to a first embodiment of the present invention.

Embodiments of the present invention will be described below with reference to the drawings. The following description and the drawings are exemplary ones for explaining the present invention, and will be omitted or simplified as appropriate for clarification of the description. The present invention can be carried out in other various modes, too. Unless limited in particular, each component may be singular or plural.

A position, a size, a shape, and a range of each component illustrated in the drawings are not illustrated as an actual position, size, shape, and range in some cases for ease of understanding of the invention. Hence, the present invention is not necessarily limited to positions, sizes, shapes, and ranges illustrated in the drawings.

When there is a plurality of components having identical or similar functions, a plurality of components will be described by assigning different subscripts to the identical reference numeral in some cases. In this regard, when a plurality of these components does not need to be distinguished, a plurality of components will be described by omitting the subscripts in some cases.

Furthermore, although a case where processing is performed by executing the program will be described in the following description, a processor (e.g., a CPU or a GPU) executes the program to perform predetermined processing while using a storage resource (e.g., memory) and/or an interface device (e.g., communication port) as appropriate, and therefore a subject of processing may be the processor. Similarly, the subject of processing performed by executing the program may be a controller, a device, a system, a calculator, or a node which includes the processor. The subject of processing performed by executing the program only needs to be a computation device, and may include a dedicated circuit (e.g., an FPGA or an ASIC) which performs specific processing.

The program may be installed in a device such as a calculator from a program source. The program source may be, for example, a program distribution server or a calculator readable storage medium. In a case where the program source is the program distribution server, the program distribution server includes a processor and a storage resource which stores a distribution target program, and the processor of the program distribution server may distribute the distribution target program to another calculator. Furthermore, two or more programs may be realized as one program, and one program may be realized as two or more programs in the following description.

First Embodiment

Next, the first embodiment of the present invention will be described.

[Description of Device Configuration]

FIG. 1 is a diagram illustrating a configuration example of an external appearance inspection system which includes an inspection route generation device according to the first embodiment of the present invention. The external appearance inspection system illustrated in FIG. 1 is configured by connecting an inspection route generation device 100 and an external appearance inspection device 200 to each other via a communication line 300. The communication line 300 is configured using, for example, the Ethernet (registered trademark), a wireless LAN, or the like, and transmits various pieces of information transmitted and received between the inspection route generation device 100 and the external appearance inspection device 200.

The external appearance inspection device 200 includes an imaging unit 210, a robot unit 220, and a computation processing unit 230. The imaging unit 210 images an unillustrated inspection target, and outputs the obtained captured image to the computation processing unit 230. The robot unit 220 is configured by combining a plurality of joints (joints) configured to be rotatable along a predetermined rotation direction, and links connecting the respective joints, and moves the imaging unit 210 attached to a distal end part to an arbitrary inspection position, and takes a posture matching an arbitrary imaging direction by adjusting an angle of each joint according to control of the computation processing unit 230. The computation processing unit 230 controls the robot unit 220, and determines whether or not an external appearance of the inspection target is normal based on the captured image input from the imaging unit 210. Thus, the external appearance of the inspection target is inspected.

The inspection route generation device 100 generates an order of respective inspection positions through which the imaging unit 210 passes when the external appearance inspection device 200 performs external appearance inspection on the inspection target, and a posture of the imaging unit 210 at each inspection position as an inspection route of the external appearance inspection device 200. Furthermore, information of the generated inspection route is transmitted to the external appearance inspection device 200 to assist the external appearance inspection device 200 to perform external appearance inspection on the inspection target.

The inspection route generation device 100 includes an input device 110, an output device 120, a storage unit 130, and a computation device 140.

The input device 110 is a device for inputting each information to be described later stored in the storage unit 130 by a user's operation. The input device 110 is configured using, for example, a keyboard, a mouse, a touch panel, or the like.

The output device 120 is a device for outputting information of the generated inspection route or the like, and providing the information to the user. The output device 120 is configured using, for example, a display, a printer, a smartphone, a tablet PC, or the like.

The storage unit 130 stores information input from the user using the input device 110, and information of a computation result of the computation device 140 or the like. The storage unit 130 is configured using a known information storage device such as a Hard Disk Drive (HDD) or a Solid State Drive (SSD) which can read and write data. The storage unit 130 stores inspection device configuration information 131, inspection target information 132, inspection condition information 133, route graph information 134, and output information 135. Note that information other than these pieces of information such as information of a program executed by the computation device 140 or the like may be stored in the storage unit 130.

The inspection device configuration information 131 is information which relates to a configuration of the external appearance inspection device 200, and includes robot configuration information 1310 and inspection equipment configuration information 1311. The robot configuration information 1310 is information which indicates a shape, a range and a limit speed of each joint angle, and the like of the robot unit 220 of the external appearance inspection device 200. The inspection equipment configuration information 1311 is information which indicates arrangement of the imaging unit 210 and the robot unit 220 which constitute the external appearance inspection device 200.

The inspection target information 132 is information which relates to the inspection target on which the external appearance inspection device 200 performs external appearance inspection, and includes shape information 1320 and inspection target area information 1321. The shape information 1320 is information which indicates the shape of the inspection target. The inspection target area information 1321 is information which indicates an external appearance inspection target area of the inspection target.

The inspection condition information 133 is information which relates to a constraint condition at a time when the external appearance inspection device 200 performs external appearance inspection on the inspection target, and includes inspection position information 1330, inspectable area information 1331, and camera movable range information 1332. The inspection position information 1330 is information which indicates an inspection position at which the imaging unit 210 images the inspection target and a posture of the imaging unit 210 at each inspection position. The inspectable area information 1331 is information which indicates an inspectable area per inspection position. Note that the inspectable area indicated by the inspectable area information 1331 is a surface area on which the external appearance inspection device 200 can perform external appearance inspection based on the captured image per inspection position acquired by the imaging unit 210 among a plurality of the external appearance inspection target surface areas of the inspection target. The camera movable range information 1332 is information which indicates a movable range of the imaging unit 210 at each inspection position. Note that the movable range indicated by the camera movable range information 1332 corresponds to a constraint condition of the posture of the imaging unit 210 at each inspection position.

The route graph information 134 is information which relates to a route graph used for computation performed by the computation device 140 when an inspection route of the external appearance inspection device 200 is generated, and includes inter-node connection information 1340 and movement cost information 1341. The inter-node connection information 1340 is information which indicates an inter-node connection relationship associated with each inspection position. The movement cost information 1341 is information which indicates movement cost matching a duration of a movement time at a time when the imaging unit 210 moves between respective nodes indicated by the inter-node connection information 1340.

The output information 135 is information which indicates a computation result of the computation device 140, and includes inspection route information 1350, camera angle information 1351, and robot posture information 1352. The inspection route information 1350 is information which indicates an optimal inspection route of the external appearance inspection device 200 generated by computation of the computation device 140. The camera angle information 1351 is information which indicates a rotation angle of the imaging unit 210 at each inspection position in the inspection route indicated by the inspection route information 1350. The robot posture information 1352 is information which indicates a posture of the robot unit 220 at each inspection position in the inspection route indicated by the inspection route information 1350.

The computation device 140 is a part which performs various arithmetic processing for generating the inspection route at the inspection route generation device 100, and includes known elements such as a CPU, a GPU, a RAM, and a ROM. The computation device 140 includes respective functional blocks of a route determination unit 141, an inspectable area calculation unit 142, a camera movable range calculation unit 143, a route graph generation unit 144, a movement cost calculation unit 145, a minimum cost route selection unit 146, and an output information generation unit 147 as functions thereof. The computation device 140 can realize these functional blocks by executing, for example, predetermined programs stored in advance.

The route determination unit 141 determines an inspection route using the respective functional block of the inspectable area calculation unit 142 to the output information generation unit 147. Note that details of processing performed by the route determination unit 141 will be described later with reference to FIGS. 9 and 10.

The inspectable area calculation unit 142 calculates an inspectable area per inspection position, and stores a computation result of the inspectable area as the inspectable area information 1331 in the storage unit 130.

The camera movable range calculation unit 143 calculates a movable range of the imaging unit 210 per inspection position, and stores a computation result of the movable range as the camera movable range information 1332 in the storage unit 130.

The route graph generation unit 144 sets a node corresponding to each inspection position, and generates a route graph which indicates an inter-node connection relationship. Furthermore, information of the generated route graph is stored as the inter-node connection information 1340 in the storage unit 130.

The movement cost calculation unit 145 calculates movement cost at a time when the imaging unit 210 moves between the respective nodes of the route graph based on the inspection device configuration information 131 and the inspection condition information 133, and stores a computation result of the movement cost as the movement cost information 1341 in the storage unit 130.

The minimum cost route selection unit 146 selects a route of minimum cost which passes through all nodes based on the route graph generated by the route graph generation unit 144 and the movement cost calculated by the movement cost calculation unit 145. Thus, an optimal inspection route is generated when the external appearance inspection device 200 performs external appearance inspection on the inspection target.

The output information generation unit 147 determines a rotation angle (imaging direction) of the imaging unit 210 at each node and an angle of each joint of the robot unit 220 at each node for the route of the minimum cost selected by the minimum cost route selection unit 146. Furthermore, the output information 135 is generated using these pieces of determined information and information of the inspection route generated by the minimum cost route selection unit 146, and is stored in the storage unit 130.

[Description of Data]

Next, data used by the inspection route generation device according to the first embodiment of the present invention will be described below with reference to FIGS. 2 to 8.

FIG. 2 is a diagram illustrating an example of data of the robot configuration information 1310 of the inspection device configuration information 131 stored in the storage unit 130. In the example in FIG. 2, the robot configuration information 1310 includes data indicated in data columns 101 to 103 for each component which constitutes the robot unit 220. In the data column 101, names such as a "robot", a "link", a "joint", and the like are stored as category names of each component which constitutes the robot unit 220. In the data column 102, a data item name is stored. In the data column 103, a data value, a file name, and the like are stored as information corresponding to the item name of the data column 102.

FIG. 3 is a diagram illustrating an example of data of the inspection equipment configuration information 1311 of the inspection device configuration information 131 stored in the storage unit 130. In the example in FIG. 3, the inspection equipment configuration information 1311 includes data indicated in data columns 111 to 114 for each equipment which constitutes the external appearance inspection device 200. In the data column 111, the name of each equipment which constitutes the external appearance inspection device 200 is stored. In the data column 112, information indicating attachment target equipment corresponding to each equipment, that is, to which other equipment each equipment is attached is stored. In the data column 113, information related to a relative position of each equipment with respect to the attachment target equipment is stored. In the data column 114, information related to a relative posture of each equipment with respect to the attachment target equipment is stored.

FIG. 4 is a diagram illustrating an example of data of the inspection target area information 1321 of the inspection target information 132 stored in the storage unit 130. In the example in FIG. 4, the inspection target area information 1321 includes data indicated in data columns 211 to 218 for each inspection target on which the external appearance inspection device 200 performs external appearance inspection. The data column 211 stores a part name of each inspection target. In the data columns 211 to 218, each information is stored which indicates whether or not these areas F1 to Fn (n is a natural number) are external appearance inspection targets in a case where a surface of each inspection target is divided into a plurality of areas and respective areas are F1 to Fn. More specifically, in the data columns 211 to 218, "1" indicates that the area is an inspection target, and "0" indicates that the area is not an inspection target. Note that data indicating the areas F1 to Fn of the inspection target is stored as the shape information 1320 of the inspection target information 132 in the storage unit 130, and can be expressed in a known polygon data format such as STL.

FIG. 5 is a diagram illustrating an example of data of the inspection condition information 133 stored in the storage unit 130. In the example in FIG. 5, the inspection condition information 133 includes data indicated in data columns 301 to 307, 311 to 316, and 321 to 322 for each inspection position where the imaging unit 210 images the inspection target when the external appearance inspection device 200 performs external appearance inspection. In the data column 301, information indicating each inspection position is stored. In the example in FIG. 5, respective inspection positions are A to L, and information indicating the inspection positions A to L is stored.

In the data columns 302 to 304, information indicating the relative position of each inspection position with respect to the inspection target is stored. In the data columns 305 to 307, information indicating a relative posture of the imaging unit 210 at each inspection position with respect to the inspection target is stored. Each data of these data columns 302 to 307 configures the inspection position information 1330.

In the data columns 311 to 316, information indicating whether or not the external appearance inspection device 200 can perform external appearance inspection on the areas F1 to Fn based on the captured image of the inspection target acquired by the imaging unit 210 at each inspection position. More specifically, in the data columns 311 to 316, "1" indicates that the area can be inspected based on the captured image obtained at each inspection position, and "0" indicates that the area cannot be inspected based on the captured image obtained at each inspection position. Each data of these data columns 311 to 316 configures the inspectable area information 1331.

In the data columns 321 to 322, each information indicating a range in which the robot unit 220 can move the imaging unit 210 at each inspection position is stored. In the example in FIG. 5, a minimum rotation angle stored in the data column 321 and a maximum rotation angle stored in the data column 322 indicate a rotation angle range in a case where the imaging unit 210 is rotated in a yaw direction. More specifically, for the inspection position A, for example, "30" is stored in the data column 321, and "200" is stored in the data column 322. This indicates that the imaging unit 210 can take a posture necessary for imaging the inspection target within the range of a yaw rotation angle of 30° to 200° at the inspection position A. On the other hand, for the inspection position L, no numerical value is stored in any one of the data columns 321 and 322. This indicates that the imaging unit 210 cannot take a posture necessary for imaging the inspection target at any yaw rotation angle at the inspection position L. Each data in these data columns 321 and 322 configures the camera movable range information 1332. Note that, although the example in FIG. 5 has described the example where the yaw rotation angle indicates the camera movable range information 1332, for example, a roll rotation angle, a pitch rotation angle, or the like may indicate the camera movable range information 1332, or may be combined to indicate the camera movable range information 1332.

Figures 6, 7:
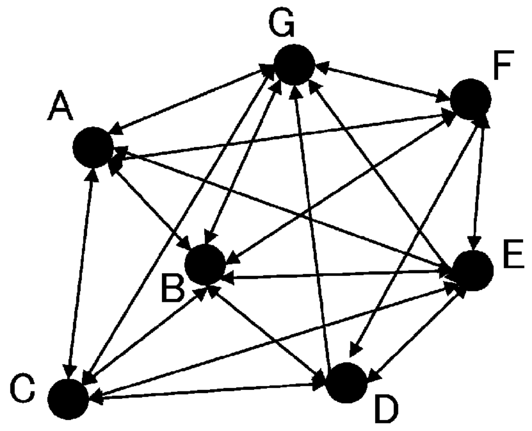
FIG. 6 is a diagram illustrating an example of an inter-node connection relationship indicated by inter-node connection information.
FIG. 7 is a diagram illustrating an example of data of movement cost information.

FIG. 6 is a diagram illustrating an example of an inter-node connection relationship indicated by the inter-node connection information 1340 of the route graph information 134 stored in the storage unit 130. As illustrated in, for example, FIG. 6, nodes corresponding to the inspection positions A to G are set to the inter-node connection information 1340, and an inter-node connection relationship between these nodes is expressed by arrows. The information of the arrows between the respective nodes illustrated in FIG. 6 is stored as the inter-node connection information 1340 in the storage unit 130, so that a combination of orders that the imaging unit 210 moves through the inspection positions A to G when the external appearance inspection device 200 performs external appearance inspection on the inspection target is expressed.

FIG. 7 is a diagram illustrating an example of data of the movement cost information 1341 of the route graph information 134 stored in the storage unit 130. In the example in FIG. 7, in the movement cost information 1341, a numerical value indicating a magnitude of the movement cost is stored per combination of a column 411 indicating a start point node and a row 422 indicating an end point node for each inter-node connection relationship indicated by the inter-node connection information 1340. Note that no numerical value is stored for nodes such as a combination of a start point B and an end point C in FIG. 7 which are known to have high movement cost. Furthermore, a constraint for going around inspection positions in a clockwise direction or the like is placed, and therefore the numerical value of the movement cost stored for inter-node movement takes an asymmetric numerical value such that the numerical value changes when the start point and the end point are interchanged. These numerical values of the movement cost are calculated by the movement cost calculation unit 145 by obtaining a movement time between the respective inspection positions, and a posture change and a traveling direction of the imaging unit 210, and the like based on the inspection device configuration information 131 and the inspection condition information 133.

FIG. 8 is a diagram illustrating an example of data of the output information 135 stored in the storage unit 130. In the example in FIG. 8, the output information 135 includes data indicated in data columns 501 to 507, 511, and 521 to 525 per inspection position at which the imaging unit 210 images the inspection target when the external appearance inspection device 200 performs external appearance inspection. In the data column 501, information indicating each inspection position is stored in an order that the imaging unit 210 passes through the inspection route generated by the minimum cost route selection unit 146.

In the data columns 502 to 504, information indicating a relative position of each inspection position with respect to the inspection target is stored. In the data columns 505 to 507, information indicating a relative posture of the imaging unit 210 at each inspection position with respect to the inspection target is stored. Each data in these data columns 502 to 507 configures the inspection route information 1350. Note that data of each row in the inspection route information 1350 corresponds to the data of each row in the inspection position information 1330, and the same data is stored at the same inspection position.

In the data column 511, information indicating the rotation angle of the imaging unit 210 at each inspection position is stored. The example in FIG. 8 illustrates the rotation angle in the yaw direction of the imaging unit 210. The data of this data column 511 configures the camera angle information 1351. Note that, although the example in FIG. 8 has described the example where the yaw rotation angle indicates the camera angle information 1351, for example, a roll rotation angle, a pitch rotation angle, or the like may indicate the camera angle information 1351, or may be combined to indicate the camera angle information 1351.

In the data columns 521 to 525, information is stored which indicates angles of these joints J1 to Jn (n is a natural number) at each inspection position in a case where each joint of the robot unit 220 is J1 to Jn. Each data in these data columns 521 to 525 configures the robot posture information 1352.

[Description of Flowchart]

Next, inspection route planning processing executed by the inspection route generation device according to the first embodiment of the present invention will be described below with reference to flowcharts in FIGS. 9 and 10 and an explanatory diagram in FIG. 11.

Figure 9:
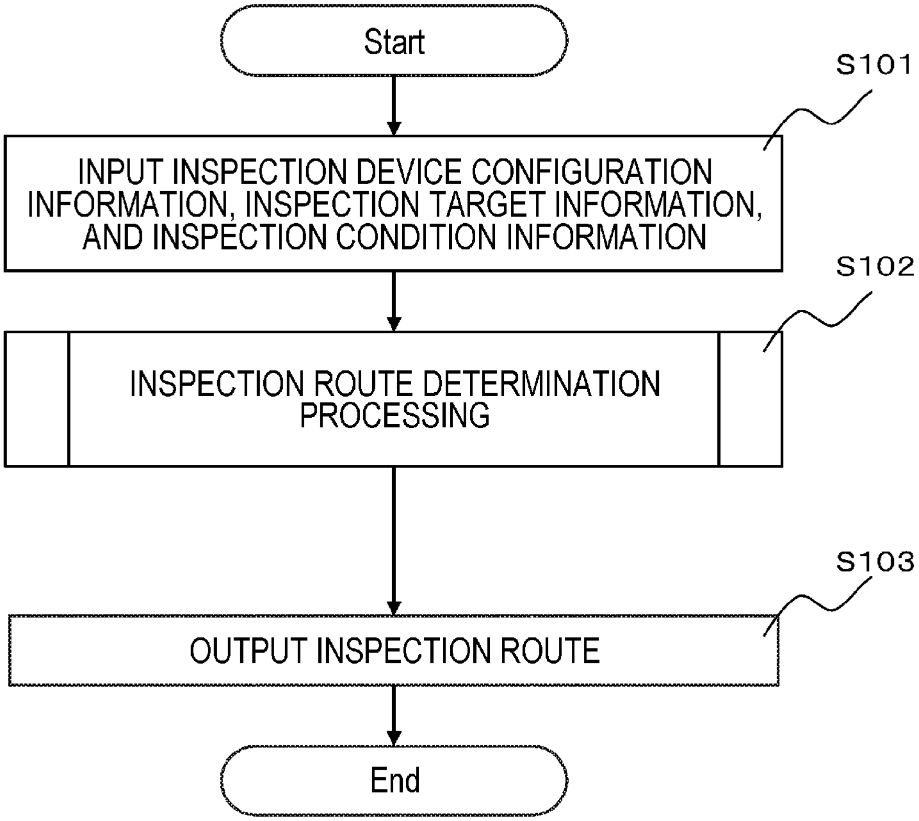
FIG. 9 illustrates an example of a flowchart of inspection route planning processing according to the first embodiment of the present invention.

FIG. 9 is an example of the flowchart of the inspection route planning processing according to the first embodiment of the present invention. The processing indicated in the flowchart in FIG. 9 is executed by the route determination unit 141 of the computation device 140.

In step S101, the inspection device configuration information 131, the inspection target information 132, and the inspection position information 1330 are read as the information used for processing in step S102 from the storage unit 130, and input to the computation device 140. It is assumed that these pieces of information are stored in advance in the storage unit 130 based on, for example, information input in advance by the user using the input device 110.

In step S102, inspection route determination processing for determining an optimal inspection route is executed based on each information input in step S101. Details of the inspection route determination processing executed in this step S102 will be described later with reference to the flowchart in FIG. 10.

In step S103, information of the inspection route determined in step S102 is stored as the output information 135 in the storage unit 130, and is output to the output device 120.

Figure 10:
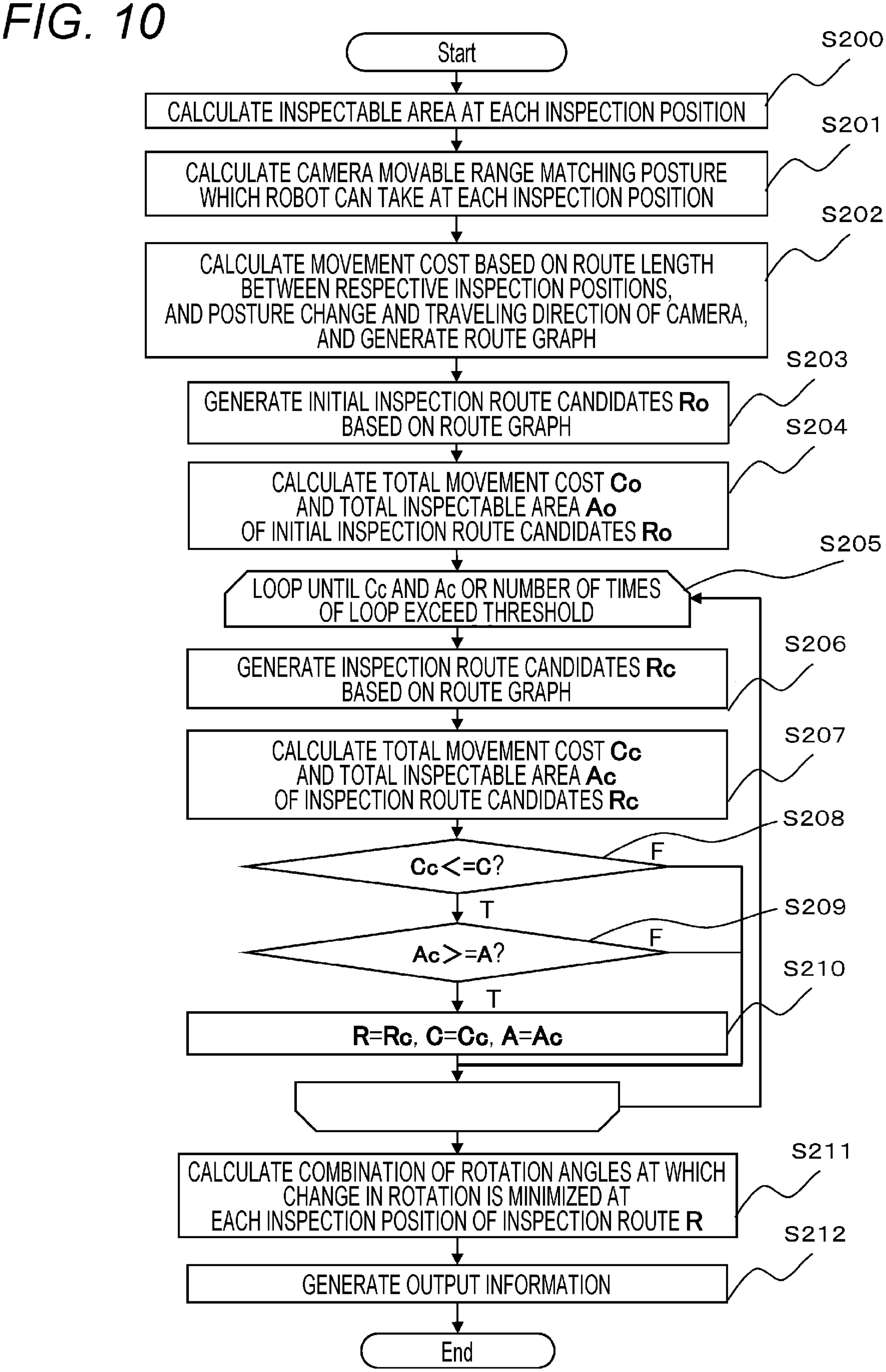
FIG. 10 is an example of a flowchart of inspection route determination processing.

FIG. 10 is an example of a flowchart of the inspection route determination processing performed in step S102. The processing indicated in the flowchart in FIG. 10 is executed by causing the route determination unit 141 to appropriately invoke the inspectable area calculation unit 142, the camera movable range calculation unit 143, the route graph generation unit 144, the movement cost calculation unit 145, the minimum cost route selection unit 146, and the output information generation unit 147 in the computation device 140, and thereby using these functional blocks.

In step S200, the inspectable area of the external appearance inspection device 200 at each inspection position is calculated based on the inspection target information 132 and the inspection position information 1330 read in step S101 in FIG. 9. Here, for example, based on the relative position and the posture of the imaging unit 210 at each inspection position indicated by the inspection position information 1330, and the shape information 1320 included in the inspection target information 132, the inspectable area calculation unit 142 compares a position and an orientation of the imaging unit 210 and positions and orientations of the areas F1 to Fn of the inspection target per inspection position. As a result, when a difference between these positions and orientations is within a predetermined range, the area is decided as the inspectable area, and when the difference is outside the predetermined range, it is decided that the area is not the inspectable area. Consequently, it is possible to calculate the inspectable area. The information of the inspectable area calculated in step S200 is stored as the inspectable area information 1331 included in the inspection condition information 133 in the storage unit 130. Furthermore, based on the inspection target area information 1321 included in the inspection target information 132, inspection target areas in the calculated inspectable areas are extracted, and the areas of the respective extracted inspectable areas are calculated based on the shape information 1320. The area of each inspectable area calculated here is used to calculate total inspectable areas Ao and Ac in steps S204 and S207 described later.

In step S201, the movable range of the imaging unit 210 corresponding to the posture which the robot unit 220 can take at each inspection position is calculated based on the inspection device configuration information 131 and the inspection position information 1330 read in step S101 in FIG. 9. Here, for example, the camera movable range calculation unit 143 acquires information of the shape, and an angle range and a limit speed of each joint of the robot unit 220, the shape and arrangement of each equipment at the external appearance inspection device 200, and the like from the robot configuration information 1310 and the inspection equipment configuration information 1311 included in the inspection device configuration information 131, and calculates a range of the posture which the robot unit 220 can take at each inspection position based on these pieces of information. Furthermore, the movable range of the imaging unit 210 at each inspection position, that is, the constraint condition of the posture of the imaging unit 210 is calculated from the calculated range of the posture of the robot unit 220. The information of the movable range of the imaging unit 210 calculated in step S201 is stored as the camera movable range information 1332 included in the inspection condition information 133 in the storage unit 130.

In step S202, movement cost between the respective inspection positions is calculated based on the inspection position information 1330 read in step S101 in FIG. 9 and the camera movable range information 1332 calculated in step S201 to generate a route graph. Here, for example, the route graph generation unit 144 sets a node corresponding to each inspection position based on the inspection position information 1330, and sets a movement route which expresses a connection relationship of the imaging unit 210 by lines connecting the nodes. Furthermore, the movement cost calculation unit 145 calculates a route length (inter-node distance) of each set movement route, the posture change amount and the traveling direction of the imaging unit 210, and the like based on the inspection position information 1330 and the camera movable range information 1332, and calculates each inter-node movement cost using computation results thereof. Consequently, it is possible to generate the route graph. The information of the movement route and the information of the movement cost calculated in step S202 are respectively stored as the inter-node connection information 1340 and the movement cost information 1341 included in the route graph information 134 in the storage unit 130.

Figure 11:
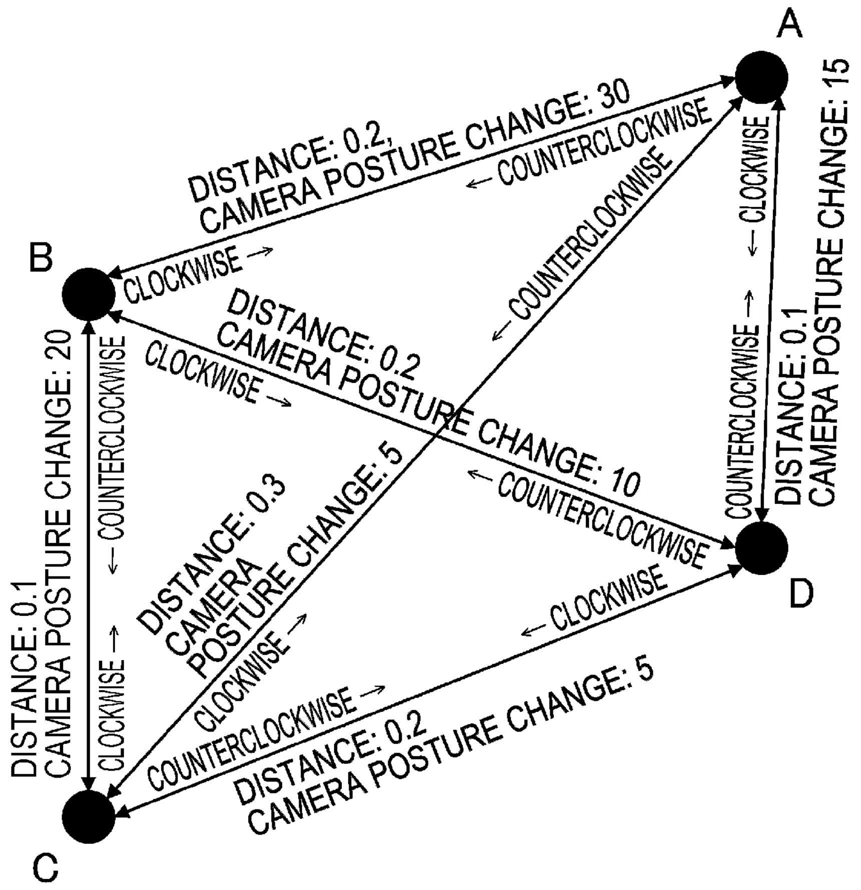
FIG. 11 is an explanatory diagram of a movement cost calculation method.

FIG. 11 is an explanatory diagram of a movement cost calculation method. Hereinafter, an example of a case where four nodes A to D are set as illustrated in FIG. 11 and movement cost between these nodes is calculated will be described.

For all combinations obtained by selecting two nodes from the four nodes A, B, C, and D illustrated in FIG. 11, the movement cost calculation unit 145 calculates a length (distance) of each movement route which connects the two points, and the posture change amount and the traveling direction of the imaging unit 210. FIG. 11 illustrates the example of the distance of each movement route, and the posture change amount and the traveling direction of the imaging unit 210 calculated in this manner. For example, a movement route whose start point is the node A and whose end point is the node B indicates that the distance is 0.2, the posture change amount of the imaging unit 210 is 30, and the imaging unit 210 moves in a counterclockwise direction.

By evaluating a duration of a time required by the imaging unit 210 to move along each movement route based on each of the above information calculated for each movement route, the movement cost calculation unit 145 can calculate each inter-node movement cost, and set the movement cost information 1341. At this time, for example, for a movement route whose movement cost becomes obviously excessive compared to other movement routes such as a movement route in which the posture change amount of the imaging unit 210 is a predetermined threshold or more, it is preferable not to set the movement cost to the movement cost information 1341 like a combination of the start point B and the end point C in the example in FIG. 7. By so doing, it is possible to exclude, in advance, inspection route candidates whose movement cost is high, and efficiently determine the inspection route in the processing after step S203 described later.

Back to description of FIG. 10, in step S203, the minimum cost route selection unit 146 generates initial inspection route candidates Ro using the route graph generated in step S202. Here, the initial inspection route candidates Ro are generated by randomly selecting an order to pass through nodes in the route graph to set as initial values of inspection route candidates Rc. At this time, a route which passes through all nodes may not necessarily be selected. Routes which pass through at least two or more nodes can be selected as the initial inspection route candidates Ro. Furthermore, for a movement route for which cost is not set to the movement cost information 1341 such as a movement route corresponding to the combination of the start point B and the end point C in FIG. 7, it is preferable to generate the initial inspection route candidates Ro without including the movement route.

In step S204, the minimum cost route selection unit 146 calculates total movement cost Co and the total inspectable area Ao of the initial inspection route candidates Ro generated in step S203. For example, by summing the movement costs calculated in step S202 for the respective movement routes included in the initial inspection route candidates Ro according to an order to pass through the nodes selected for the initial inspection route candidates Ro, it is possible to calculate the total movement cost Co. Furthermore, by summing areas of the inspectable areas calculated in step S200 for the respective inspection positions corresponding to the respective nodes of the initial inspection route candidates Ro while avoiding overlapped areas, it is possible to calculate the total inspectable area Ao. Note that the total movement cost Co and the total inspectable area Ao of the initial inspection route candidates Ro calculated in step S204 respectively correspond to the initial values of total movement cost Cc and the total inspectable area Ac of the inspection route candidate Rc.

In steps S205 to S210, loop processing is executed. Here, until values of the total movement cost Cc and the total inspectable area Ac of the inspection route candidate Rc set during the loop processing each exceed a predetermined threshold, or the number of times of loop exceeds a predetermined threshold, the processing in steps S206 to S210 is repeatedly executed.

In step S206, the minimum cost route selection unit 146 generates the new inspection route candidates Rc from the route graph generated in step S202. Here, by randomly selecting the order to pass through the nodes in the route graph similarly to step S203, it is possible to generate unselected inspection routes as the inspection route candidates Rc. Alternatively, the inspection route candidate Rc may be generated by, for example, replacing, adding, or deleting part of nodes of a current inspection route R in the loop processing. Also in this case, similarly to step S203, a route which passes through all nodes may not be selected. Routes which pass through at least two or more nodes can be selected as the inspection route candidates Rc. Furthermore, for a movement route for which cost is not set to the movement cost information 1341, it is preferable to generate the inspection route candidates Rc without including the movement route.

In step S207, the minimum cost route selection unit 146 calculates the total movement cost Cc and the total inspectable area Ac of the inspection route candidate Rc generated in step S206. Here, it is possible to calculate the total movement cost Cc and the total inspectable area Ac by the method similar to that in step S204.

In step S208, the minimum cost route selection unit 146 compares the total movement cost Cc of the inspection route candidate Rc calculated in step S207, and the total movement cost C of the current inspection route R. As a result, the flow proceeds to processing in step S209 in a case of Cc<=C, and transitions to the processing in step S205 in other cases.

In step S209, the minimum cost route selection unit 146 compares the total inspectable area Ac of the inspection route candidate Rc calculated in step S207, and a total inspectable area A of the current inspection route R. As a result, the flow proceeds to processing in step S210 in a case of Ac>=A, and transitions to the processing in step S205 in other cases.

In step S210, the minimum cost route selection unit 146 updates the inspection route R, and the total movement cost C and the total inspectable area A of the inspection route R. Here, the inspection route candidate Rc generated in latest step S206 is set as the inspection route R, and the total movement cost Cc and the total inspectable area Ac of this inspection route candidates Rc are set as the total movement cost C and the total inspectable area A of the inspection route R, respectively, to update these values. After the processing in step S210 is performed, the flow transitions to the processing in step S205.

When the loop processing in steps S205 to S210 ends, an inspection route whose total movement cost Cc is the lowest and whose total inspectable area Ac is largest among the plurality of inspection route candidates Rc is finally determined as the inspection route R.

In step S211, the output information generation unit 147 calculates the rotation angle of the imaging unit 210 with respect to each inspection position of the inspection route R finally determined by the loop processing in steps S205 to S210. Here, a combination of rotation angles which minimize a change in the yaw rotation angle of the imaging unit 210 within the camera movable range calculated in step S201 is selected per inspection position of the inspection route R according to the order to pass through the respective inspection positions in the inspection route R. Note that a similar calculation method is applicable to a case, too, where a roll rotation angle, a pitch rotation angle, and the like are set to the imaging unit 210 as described above. Consequently, a posture P of the imaging unit 210 in the inspection route R is calculated.

In step S212, the output information 135 is generated based on the inspection route R finally determined by the loop processing in steps S205 to S210 and the posture P calculated in step S212. Here, for example, the output information generation unit 147 determines the angle of each joint of the robot unit 220 at each node of the inspection route R based on the inspection device configuration information 131 and the inspection position information 1330 read in step S101 in FIG. 9. Furthermore, the inspection position information 1330 read in step S101 is rearranged according to the order to pass through the respective inspection positions in the inspection route R, and the posture P and the angle of each joint matching each inspection position are set to determine the inspection route information 1350, the camera angle information 1351, and the robot posture information 1352. Consequently, it is possible to generate the output information 135. The output information 135 generated in step S212 is stored in the storage unit 130, and output to the output device 120 in step S103 in FIG. 9. Note that, at this time, information of the total movement cost C and the total inspectable area A of the inspection route R and the like may be included in the output information 135.

Note that, in the flowchart in FIG. 10 described above, each inter-node movement cost may not be calculated when the route graph is generated in step S202. In this case, when the total movement cost Co of the initial inspection route candidate Ro is calculated in step S204 or when the total movement cost Cc of the inspection route candidate Rc is calculated in step S207, it is preferable to calculate the total movement costs Co and Cc in consideration of a sum of inter-node distances of all inspection route candidates, the posture change amount and the change in the traveling direction of the imaging unit 210, and the like.

A method for calculating the total movement cost Cc in a case where, for example, a route which passes through the four nodes A to D illustrated in FIG. 11 in order of A→B→C→D is selected as the inspection route candidate Rc will be described below. In this case, a total route length L of the inspection route candidate Rc is obtained as L=0.2+0.1+0.2=0.5 according to each inter-node distance information. Furthermore, the traveling direction of the inspection route candidate Rc is counterclockwise—counterclockwise—counterclockwise according to each inter-node traveling direction information, and therefore the number of times of changes D of the traveling direction is D=0. Consequently, the number of times of changes D of the traveling direction becomes small, and, as a result, the inspection route becomes smooth, so that it is possible to reduce a route error caused when the imaging unit 210 continuously operates without stopping at each via-point. Furthermore, a total posture change amount Y of the imaging unit 210 in the inspection route candidate Rc is obtained as Y=30+20+5=55 according to each inter-node camera posture change information.

Based on the total route length L, the number of times of change D of the traveling direction, and the total posture change amount Y obtained as described above, the total movement cost Cc of the inspection route candidate Rc is obtained using, for example, following equation (1).

$$Cc=\alpha L+\beta D+\gamma Y \qquad \text{Equation (1)}$$

In equation (1), α, β, and γ represent weight coefficients, and arbitrary values are respectively set thereto.

In the flowchart in FIG. 10, in the loop processing in steps S205 to S210, the inspection route candidate Rc which minimizes the total movement cost Cc expressed by equation (1) is finally selected as the inspection route R. Consequently, it is possible to generate an inspection route in which the movement distance of the imaging unit 210 is short, the posture change is little, and a direction change is little.

Furthermore, in the flowchart in FIG. 10, the order of steps S208 and S209 may be rearranged, or only one of steps S208 and S209 may be performed.

When only step S208 is performed, the inspection route candidate Rc of the lowest movement cost is finally selected as the inspection route R by the loop processing in steps S205 to S210. Consequently, it is possible to obtain an inspection route which enables the external appearance inspection device 200 to perform external appearance inspection of the inspection target in a short time. At this time, whether or not the total inspectable area Ac of the inspection route candidate Rc is a predetermined threshold or more may be decided instead of performing decision in step S209, and the processing in step S210 may be performed only in a case where the total inspectable area Ac is the threshold or more. By so doing, it is possible to prevent generation of an inspection route which cannot provide desired inspection accuracy since an inspectable area of the inspection target is narrow.

On the other hand, when only step S208 is performed, the inspection route candidate Rc of the widest inspectable area is finally selected as the inspection route R by the loop processing in steps S205 to S210. Consequently, when the external appearance inspection device 200 performs external appearance inspection on the inspection target, it is possible to obtain an inspection route which can achieve maximization of the inspectable area. At this time, whether or not the total movement cost Cc of the inspection route candidate Rc is the predetermined threshold or less may be decided instead of performing decision in step S208, and the processing in step S210 may be performed only in a case where the total movement cost Cc is the threshold or less. By so doing, it is possible to prevent generation of an inspection route in which movement cost is high and therefore external appearance inspection cannot be performed within a desired time.

Alternatively, total cost W1 which is a weighted sum of the total movement cost Cc and the total inspectable area Ac of the inspection route candidate Rc may be calculated by following equation (2) instead of performing the decision in steps S208 and S209, and the inspection route candidate Rc may be evaluated using this total cost W1.

$$W1=\delta Cc+\varepsilon(A_{all}-Ac) \qquad \text{Equation (2)}$$

In equation (2), δ and ε represent weight coefficients, and arbitrary values are set thereto. Furthermore, $A_{all}$ represents a total area of inspection target areas of the inspection target.

Furthermore, instead of performing the processing in steps S203 to S210, the total cost W1 for all the movement routes included in the route graph generated in step S202 may be calculated by above equation (2), and then a route which minimizes the total cost W1 may be obtained as the inspection route R. In a case where this inspection route R is obtained, it is possible to obtain an optimal solution using a known method by, for example, handling the optimal solution of the inspection route R as traveling salesman problems. Alternatively, the inspection route R which minimizes the total cost W1 may be calculated by a general method such as a round robin algorithm or a greedy algorithm.

Furthermore, instead of performing the processing in steps S203 to S211, total cost W2 different from the above total cost W1 may be calculated for all routes indicated by the route graph generated in step S202, and then a route which minimizes the total cost W2 may be obtained as the inspection route R. The total cost W2 can be calculated using, for example, following equation (3) as, for example, a weighted sum of the total movement cost Cc, the total inspectable area Ac, and the total posture change amount Y of each inspection route candidate Rc obtained from the route graph.

$$W2=\delta Cc+\varepsilon(A_{all}-Ac)+\gamma(\mathrm{MAX}(Y)-\mathrm{MIN}(Y)) \qquad \text{Equation (3)}$$

In equation (3), MAX(Y) represents a maximum value of the total posture change amount Y, and MIN(Y) represents a minimum value of the total posture change amount Y.

By obtaining the inspection route R using the total cost W2 calculated by equation (3), the inspection route R can be optimized at a time together with the posture change amount of the imaging unit 210, too. Note that the optimal solution of the inspection route R in this case can be solved as traveling salesman problems, or can be calculated by a general method such as a round robin algorithm or a greedy algorithm.

[Description of Output]

Next, an output example of a processing result of the inspection route generation device according to the first embodiment of the present invention will be described below with reference to FIGS. 12 and 13.

Figure 12:
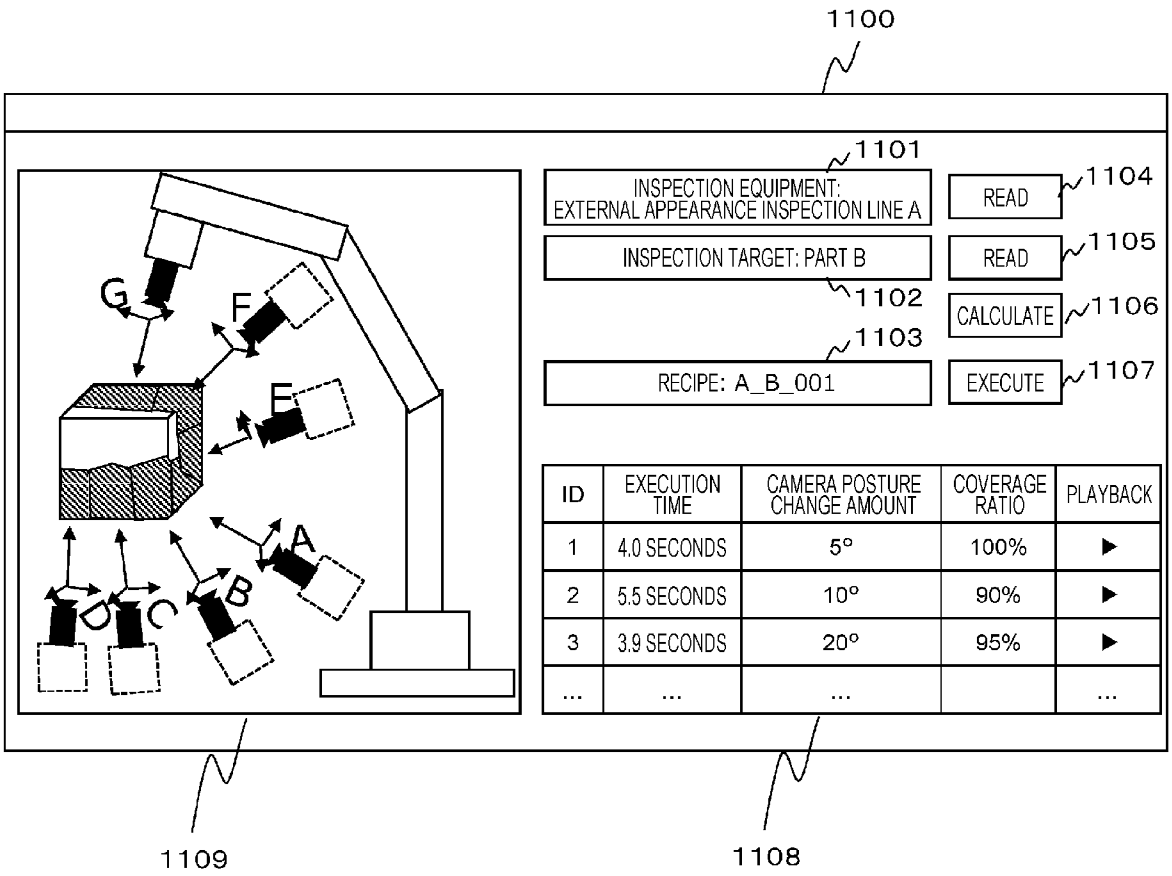
FIG. 12 is a diagram illustrating an example of an output screen of the inspection route generation device according to the first embodiment of the present invention.

FIG. 12 is a diagram illustrating an example of an output screen of the inspection route generation device according to the first embodiment of the present invention. An output screen 1100 illustrated in FIG. 12 is displayed on the output device 120 based on the output information 135 output in step S103 in FIG. 9. The output screen 1100 includes selection frames 1101 to 1103, operation buttons 1104 to 1107, an inspection route table 1108, and a display frame 1109.

The user can select arbitrary inspection equipment as the external appearance inspection device 200 using the input device 110. Information of the selected inspection equipment is displayed in the selection frame 1101. When the user performs an operation of selecting the operation button 1104 on the output screen 1100 in a state where one of the inspection equipment is selected, the inspection device configuration information 131 corresponding to the inspection equipment is stored in the storage unit 130.

The user can select an arbitrary inspection target using the input device 110. Information of the selected inspection target is displayed in a selection frame 1102. When the user performs an operation of selecting the operation button 1105 on the output screen 1100 in a state where one of the inspection targets is selected, the inspection target information 132 and the inspection position information 1330 corresponding to the inspection target are stored in the storage unit 130.

By performing an operation of selecting the operation button 1106 on the output screen 1100 after the inspection device configuration information 131, the inspection target information 132, and the inspection position information 1330 are stored in the storage unit 130 as described above, the user can cause the computation device 140 to execute route planning processing. At this time, the route determination unit 141 in the computation device 140 executes processing according to the flowcharts in FIGS. 9 and 10.

The inspection route table 1108 displays a list of inspection routes generated by the route planning processing. Here, based on the output information 135 which is determined by the route planning processing and to which the above-described total movement cost C and total inspectable area A have been added, information of, for example, an execution time of external appearance inspection in each inspection route, the posture change amount of the imaging unit 210, and a coverage ratio of the inspection target area is displayed. The user can select an execution recipe for the external appearance inspection device 200 to perform external appearance inspection by selecting one of inspection routes in the inspection route table 1108. Information of the selected execution recipe is displayed in the selection frame 1103.

When the user performs an operation of selecting the operation button 1107 on the output screen 1100 in a state where the execution recipe is selected, how external appearance inspection is performed based on the execution recipe is displayed in the display frame 1109. The user can visually check a motion of the external appearance inspection device 200 during the external appearance inspection, the posture change of the imaging unit 210, the inspectable area of the inspection target, and the like from display contents of this display frame 1109, and can determine the inspection route to adopt.

Figure 13:
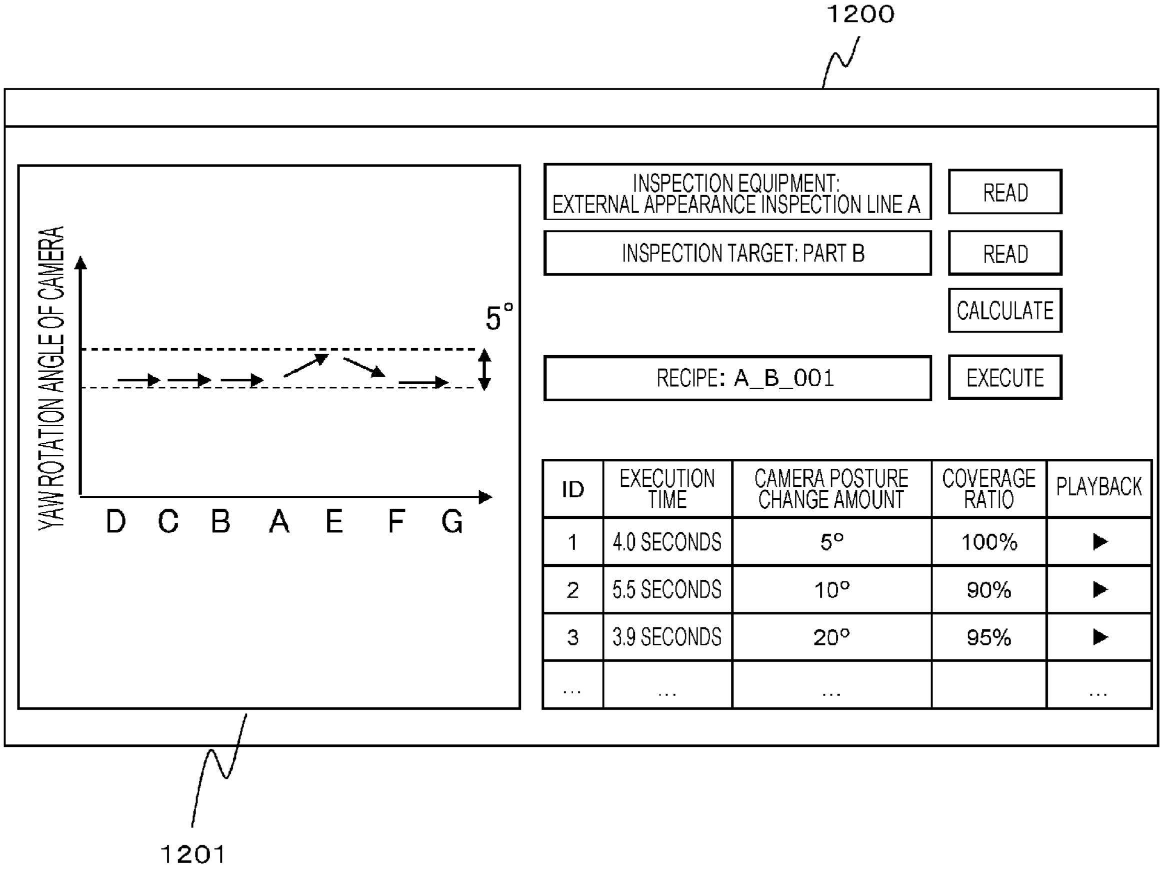
FIG. 13 is a diagram illustrating another example of an output screen of the inspection route generation device according to the first embodiment of the present invention.

FIG. 13 is a diagram illustrating another example of the output screen of the inspection route generation device according to the first embodiment of the present invention. An output screen 1200 illustrated in FIG. 13 is displayed on the output device 120 based on the output information 135 output in step S103 in FIG. 9 similarly to the output screen 1100 in FIG. 12. The output screen 1200 includes a display frame 1201 instead of the display frame 1109 in the output screen 1100 in FIG. 12.

The display frame 1201 displays how the posture of the imaging unit 210 changes such as how the yaw rotation angle changes during external appearance inspection based on the selected execution recipe. The user can check from the display contents of this display frame 1201 how much the posture of the imaging unit 210 changes during the external appearance inspection, and can determine the inspection route to adopt.

The above-described first embodiment of the present invention provides the following function and effect.

(1) The inspection route generation device 100 generates an inspection route of the external appearance inspection device 200 which performs external appearance inspection on an inspection target based on an image imaged by the imaging unit 210. The inspection route generation device 100 includes the storage unit 130 which stores the inspection position information 1330 indicating a plurality of inspection positions at which the imaging unit 210 images the inspection target, and the inspection device configuration information 131 indicating the configuration of the external appearance inspection device 200, and the route determination unit 141. The route determination unit 141 calculates a route length between respective inspection positions, and a posture change amount of the imaging unit 210 at a time when the imaging unit 210 moves through the plurality of inspection positions, based on the inspection position information 1330 and the inspection device configuration information 131 (step S202), and determines the inspection route based on the calculated route length and posture change amount (steps S203 to S210). Thus, it is possible to provide an inspection route which makes it possible to reduce an inspection time while suppressing a decrease in inspection accuracy for the external appearance inspection device 200 which performs external appearance inspection on an inspection target.

(2) The route determination unit 141 calculates the movement costs Co and Cc based on the route length between the respective inspection positions, and the posture change amount and the traveling direction of the imaging unit 210 at the time when which the imaging unit 210 moves through the plurality of inspection positions (steps S202, S204, and S206), and determines the inspection route based on the calculated movement costs Co and Cc (steps S208 to S210). Thus, it is possible to reliably determine the inspection route which makes the inspection time the shortest within a range of predetermined inspection accuracy.

(3) The route determination unit 141 calculates a constraint condition of the posture of the imaging unit 210 at each inspection position based on the inspection device configuration information 131 (step S201), and calculates the posture change amount of the imaging unit 210 based on the calculated constraint condition (step S202). Thus, it is possible to accurately calculate the posture change amount of the imaging unit 210 in consideration of the range of the posture which the imaging unit 210 can take in the external appearance inspection device 200.

(4) During calculation of the movement cost in step S202, the route determination unit 141 may not set the movement cost when the posture change amount of the imaging unit 210 between arbitrary inspection positions is the predetermined threshold or more. By so doing, when the plurality of inspection route candidates Rc is generated by the loop processing in steps S205 to S210 and the inspection route R is determined from the plurality of generated inspection route candidates Rc, the inspection route R is determined by excluding the inspection route candidates Rc corresponding to the condition. Consequently, it is possible to efficiently determine the inspection route by excluding in advance the inspection route candidate which makes an inspection time excessive.

(5) The inspection route generation device 100 causes the computation device 140 to execute processing of acquiring the inspection position information 1330 indicating a plurality of inspection positions at which the imaging unit 210 of the external appearance inspection device 200 images the inspection target, and the inspection device configuration information 131 indicating the configuration of the external appearance inspection device 200 (step S101), processing of calculating a route length between respective inspection positions, and a posture change amount of the imaging unit 210 at a time when the imaging unit 210 moves through the plurality of inspection positions, based on the acquired inspection position information 1330 and inspection device configuration information 131 (step S202), and processing of determining the inspection route based on the calculated route length and posture change amount (steps S203 to S210). Thus, it is possible to provide an inspection route which makes it possible to reduce an inspection time while suppressing a decrease in inspection accuracy for the external appearance inspection device 200 which performs external appearance inspection on an inspection target.

Second Embodiment

Next, the second embodiment of the present invention will be described below.

[Description of Device Configuration]

Figure 14:
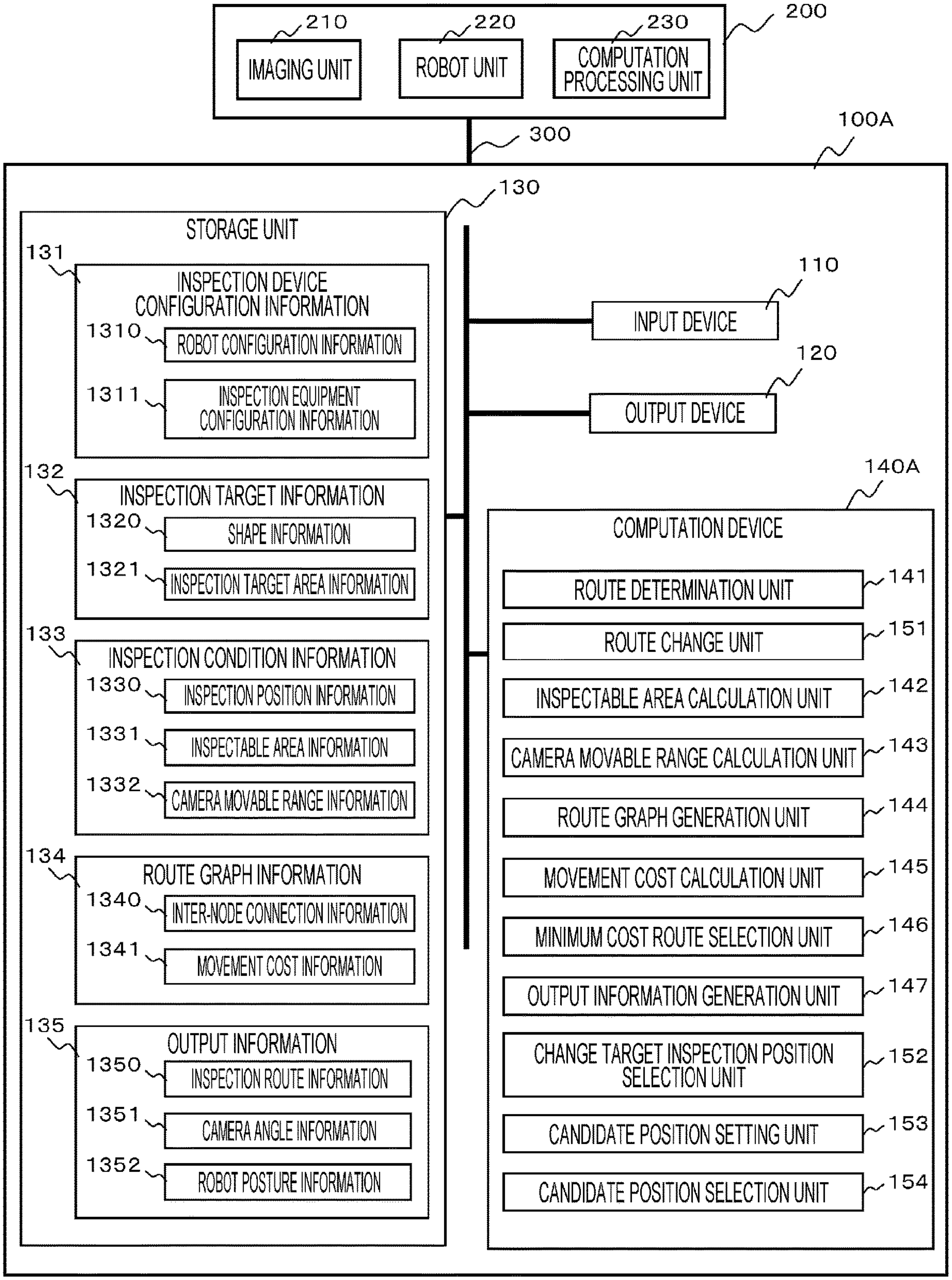
FIG. 14 is a diagram illustrating a configuration example of an external appearance inspection system which includes an inspection route generation device according to a second embodiment of the present invention.

FIG. 14 is a diagram illustrating a configuration example of an external appearance inspection system which includes an inspection route generation device according to the second embodiment of the present invention. The external appearance inspection system illustrated in FIG. 14 is configured by connecting an inspection route generation device 100A and an external appearance inspection device 200 to each other via a communication line 300. A difference between an inspection route generation device 100 in FIG. 1 described in the first embodiment and the inspection route generation device 100A illustrated in FIG. 14 is that a computation device 140A includes respective functional blocks of a route determination unit 141, an inspectable area calculation unit 142, a camera movable range calculation unit 143, a route graph generation unit 144, a movement cost calculation unit 145, a minimum cost route selection unit 146, and an output information generation unit 147 described above, and, in addition, further includes respective functional blocks of a route change unit 151, a change target inspection position selection unit 152, a candidate position setting unit 153, and a candidate position selection unit 154. Hereinafter, the present embodiment will be described focusing on these differences.

The route change unit 151 uses the respective functional blocks of the change target inspection position selection unit 152, the candidate position setting unit 153, and the candidate position selection unit 154 to change an inspection route determined by the route determination unit 141. Note that details of processing performed by the route change unit 151 will be described later with reference to FIGS. 15 and 16.

The change target inspection position selection unit 152 selects one of a plurality of inspection positions in the inspection route determined by the route determination unit 141 as a change target inspection position. The change target inspection position selection unit 152 selects the change target inspection position based on, for example, movement cost between the inspection positions or user's designation.

The candidate position setting unit 153 sets combinations of a plurality of candidate positions which are change destination inspection position candidates, and a posture of an imaging unit 210 at each candidate position around the change target inspection position selected by the change target inspection position selection unit 152.

The candidate position selection unit 154 selects a combination which does not reduce the inspectable area and minimizes total movement cost of the entire inspection route as the post-change inspection position and posture of the imaging unit 210 from the combinations of the plurality of candidate positions and the posture of the imaging unit 210 set by the candidate position setting unit 153.

[Description of Flowchart]

Next, inspection route planning processing executed by the inspection route generation device according to the second embodiment of the present invention will be described below with reference to flowcharts in FIGS. 15 and 16 and explanatory diagrams in FIGS. 17 and 18.

Figure 15:
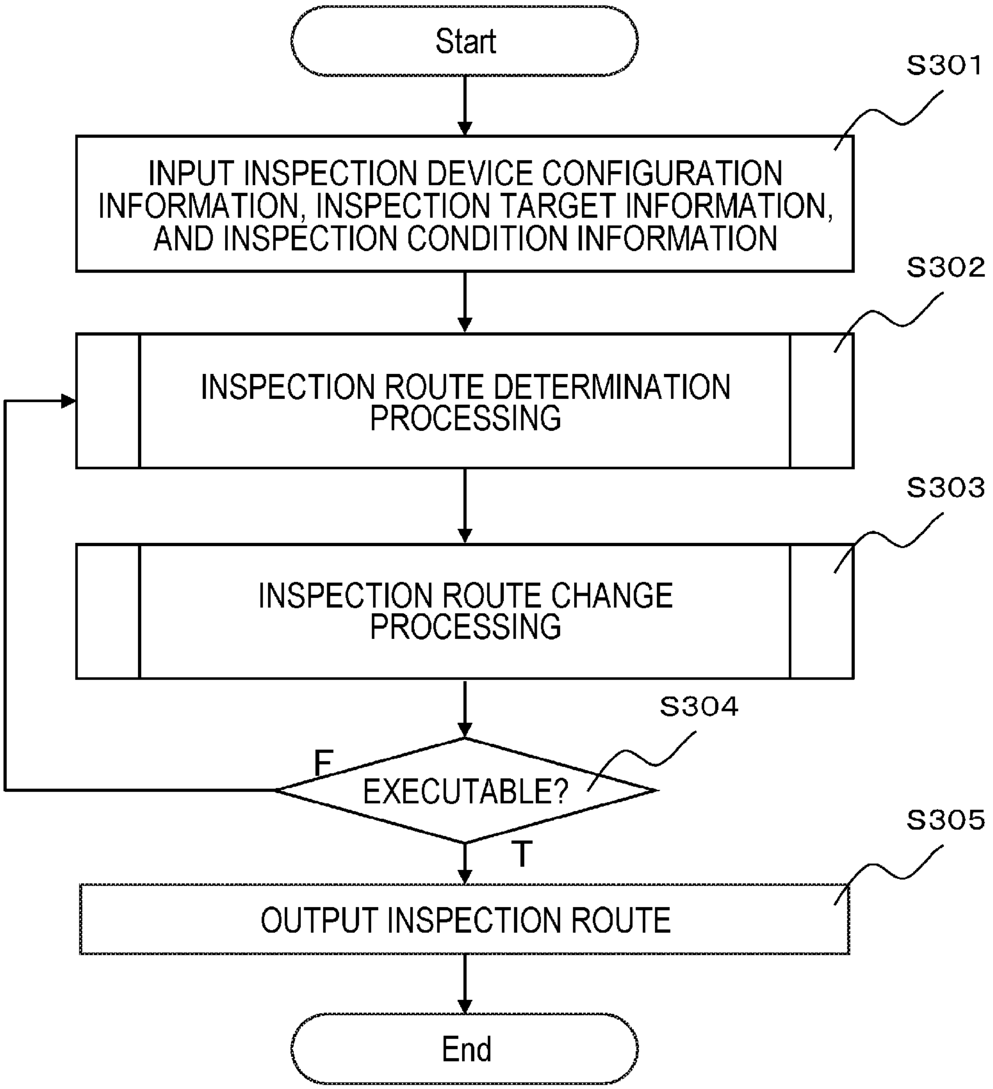
FIG. 15 illustrates an example of a flowchart of inspection route planning processing according to the second embodiment of the present invention.

FIG. 15 is an example of a flowchart of the inspection route planning processing according to the second embodiment of the present invention. Processing indicated in the flowchart in FIG. 15 is executed by the route determination unit 141 and the route change unit 151 in the computation device 140A.

In step S301, inspection device configuration information 131, inspection target information 132, and inspection position information 1330 are read as the information used for processing in step S302 from a storage unit 130, and is input to the computation device 140A. It is assumed that these pieces of information are stored in advance in the storage unit 130 based on, for example, information input in advance by the user using an input device 110.

In step S302, inspection route determination processing for determining an optimal inspection route is executed based on each information input in step S301. In this step S302, the inspection route determination processing is executed according to the flowchart in FIG. 10 described in the first embodiment.

In step S303, inspection route change processing for changing the inspection route determined in step S302 is executed. Details of the inspection route change processing executed in this step S303 will be described later with reference to the flowchart in FIG. 16.

In step S304, whether or not external appearance inspection of the inspection route changed in step S303 can be executed by the external appearance inspection device 200 is determined. For example, information of a shape, an angle range and a limit speed of each joint, and the like of the robot unit 220 of the external appearance inspection device 200, and information of a shape, arrangement, and the like of each equipment which constitutes the external appearance inspection device 200 are acquired from the inspection device configuration information 131 input in step S301, and buffer decision or the like based on these pieces of information is performed to determine whether or not an operation matching the post-change inspection route can be executed by the robot unit 220. As a result, in a case where it is determined that the operation can be executed, the flow transitions to processing in step S305, and in a case where it is determined that the operation cannot be executed, the flow transitions to processing in step S302. Note that, in the case where the flow transitions to the processing in step S302, the inspection route determination processing is executed again in step S302, so that an inspection route different from the previous inspection route is determined.

In step S305, information of the inspection route changed in step S303 is stored as output information 135 in the storage unit 130, and is output to an output device 120.

Figure 16:
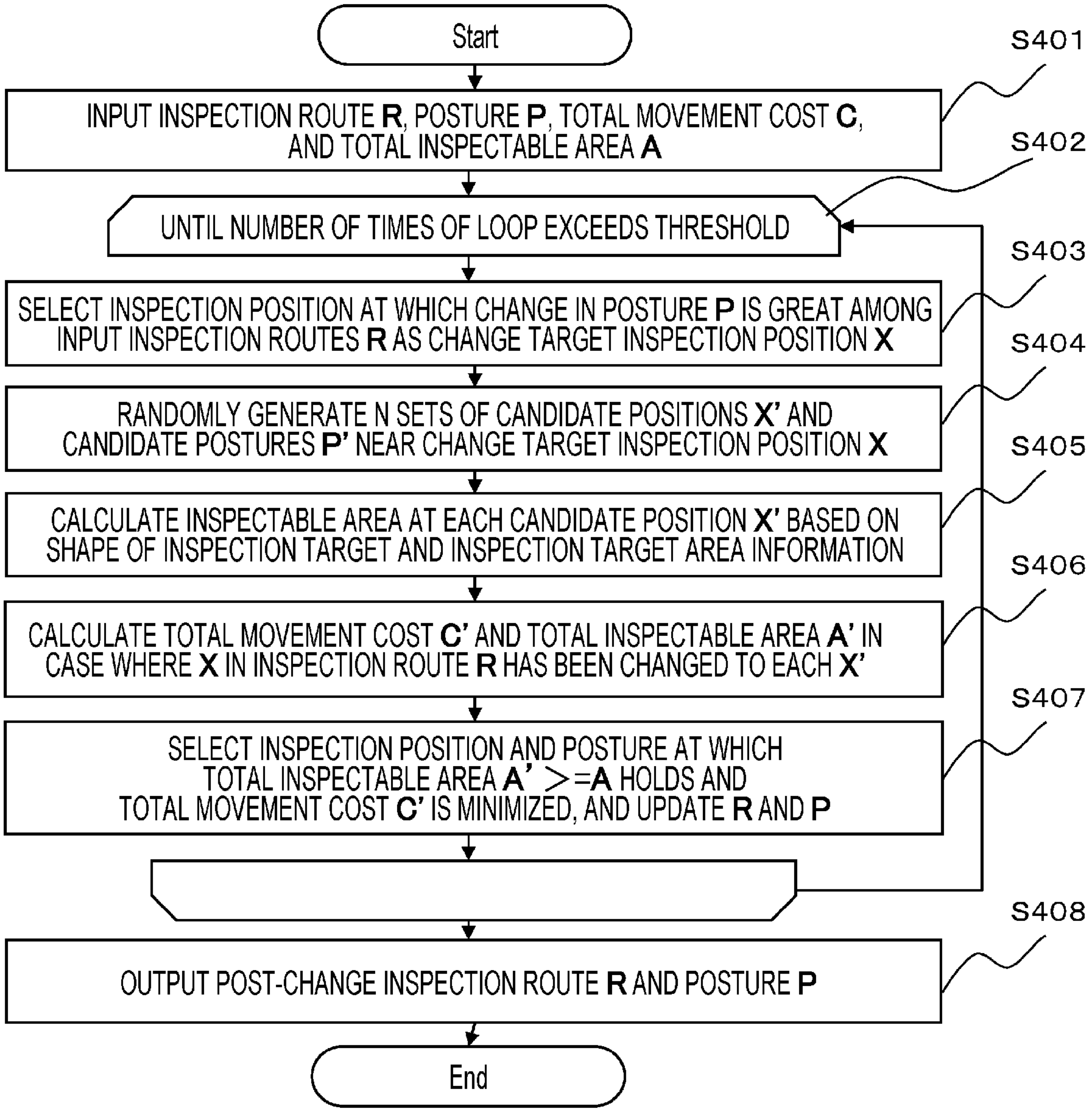
FIG. 16 illustrates an example of a flowchart of inspection route change processing.

FIG. 16 is an example of a flowchart of the inspection route change processing performed in step S303. The processing indicated in the flowchart in FIG. 16 is executed by causing the route change unit 151 to appropriately invoke the inspectable area calculation unit 142, the minimum cost route selection unit 146, the change target inspection position selection unit 152, the candidate position setting unit 153, and the candidate position selection unit 154 in the computation device 140A, and using these functional blocks.

In step S401, an inspection route R determined in step S302 in FIG. 15, a posture P of this inspection route R, total movement cost C, and a total inspectable area A are input to the route change unit 151.

In steps S402 to S407, loop processing is executed. Here, until the number of times of loop exceeds a predetermined threshold, processing in steps S403 to S407 is repeatedly executed.

In step S403, the change target inspection position selection unit 152 selects, as a change target inspection position X, the inspection position at which a change in the posture P of the imaging unit 210 is great compared to previous and next inspection positions among the plurality of inspection positions included in the inspection route R input in step S401.

Figure 17:
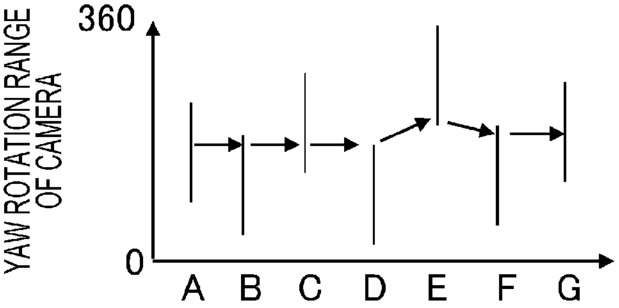
FIG. 17 is an explanatory diagram of a change target inspection position selection method.

FIG. 17 is an explanatory diagram of a change target inspection position selection method. FIG. 17 illustrates how the posture P at each inspection position changes, and a range of a yaw rotation angle of the imaging unit 210 at each inspection position in the inspection route R which passes through inspection positions A to G illustrated in FIG. 6 in order. Here, the range of the yaw rotation angle which the imaging unit 210 can take is determined in consideration of the movable range of the robot unit 220.

Arrows in the graph in FIG. 17 indicate changes in the posture P set to each inspection position, that is, changes in the yaw rotation angle of the imaging unit 210. The graph in FIG. 17 shows that the change in the posture P is great at a time of movement from the inspection position D to the inspection position E and at a time of movement from the inspection position E to the inspection position F compared to a time of movement between other inspection positions. Therefore, the inspection position E is selected as the change target inspection position X for this inspection route R.

Note that, in step S403, the change target inspection position X may be selected using another method. For example, the above-described output screen illustrated in FIGS. 12 and 13 may enable the user to select the change target inspection position X by arbitrarily selecting one of inspection positions. Furthermore, an inspection position matching a condition set in advance by the user may be selected as the change target inspection position X. In addition to this, the change target inspection position X can be selected based on various pieces of information input from the user.

Back to description of FIG. 16, in step S404, near the change target inspection position X set in step S403, the candidate position setting unit 153 randomly generates N sets (N is an arbitrary natural number) of combinations of candidate positions X' in place of the change target inspection position X, and candidate postures P' at these candidate positions X'.

Figure 18:
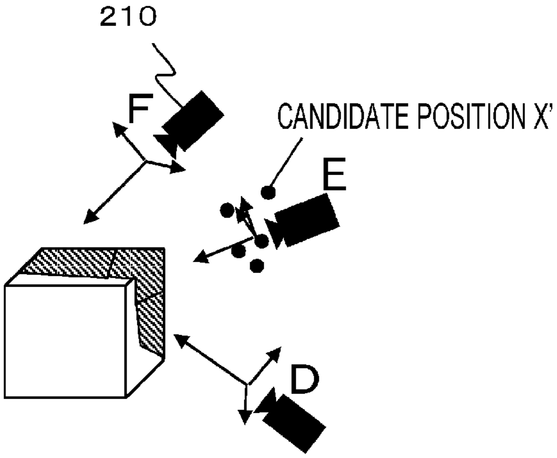
FIG. 18 is an explanatory diagram of a method for setting candidate positions and candidate postures.

FIG. 18 is an explanatory diagram of a method for setting candidate positions and candidate postures. FIG. 18 illustrates an example of the inspection positions D, E, and F of the inspection positions A to G illustrated in FIG. 6, the candidate positions X', and the candidate postures P'. As described above, in a case where the inspection position E is selected as the change target inspection position X in step S403, the N sets of combinations of the candidate positions X' and the candidate postures P' are randomly generated around this inspection position E as illustrated in FIG. 18. At this time, it is preferable to set values of the candidate position X' and the candidate posture P' such that differences from the original inspection position E and the original posture P respectively fall within predetermined ranges.

Note that, in step S404, only one of the candidate position X' and the candidate posture P' may be generated for the change target inspection position X, and the original value may be used as is for the other one of the candidate position X' and the candidate posture P'. That is, by changing at least one of the position and the posture of the imaging unit 210 at the change target inspection position X, it is possible to change the inspection route R.

Back to description of FIG. 16, in step S405, the inspectable area calculation unit 142 calculates an inspectable area of the external appearance inspection device 200 at each candidate position X' generated in step S404. Here, based on the inspection target information 132 read in step S301 in FIG. 15, it is possible to calculate the inspectable area of the external appearance inspection device 200 at each candidate position X' by a method similar to that in step S200 in FIG. 10. That is, based on a relative position of the imaging unit 210 at each candidate position X', the candidate posture P' indicating the relative posture of the imaging unit 210 at each candidate position X', and shape information 1320 included in the inspection target information 132, a position and an orientation of the imaging unit 210 and positions and orientations of areas F1 to Fn of the inspection target are compared per candidate position X'. As a result, when a difference between these positions and orientations is within a predetermined range, the area is decided as the inspectable area, and, when the difference is outside the predetermined range, it is decided that the area is not the inspectable area. Furthermore, based on inspection target area information 1321 included in the inspection target information 132, an inspection target area of the calculated inspectable area is extracted, and an area of each extracted inspectable area is calculated based on the shape information 1320. The area of each inspectable area calculated here is used when a total inspectable area A' is calculated in step S406 described later.

In step S406, the candidate position selection unit 154 calculates total movement cost C' and the total inspectable area A' of the inspection route R when the change target inspection position X in the inspection route R is changed to each candidate position X'. Here, for the combinations of the N sets of the candidate positions X' and the candidate postures P' generated in step S404, the total movement cost C' and the total inspectable area A' are respectively calculated by the method similar to those in steps S204 and S207 in FIG. 10 using the area of each inspectable area calculated in step S405. Consequently, when at least one of the position and the posture of the imaging unit 210 is changed at the change target inspection position X, it is possible to calculate the total movement cost C' which is based on a route length between respective inspection positions, and the posture change amount and the traveling direction of the imaging unit 210 at the time when which the imaging unit 210 moves through a plurality of inspection positions, and the total inspectable area A' which indicates the area of the inspection target which the external appearance inspection device 200 can inspect.

In step S407, the candidate position selection unit 154 updates the inspection route R and the posture P based on the total movement cost C' and the total inspectable area A' calculated in step S406. Here, the candidate position X' at which the total inspectable area A' is the total inspectable area A of the original inspection route R or more and the total movement cost C' is minimized among the total movement costs C' and the total inspectable areas A' calculated for the respective candidate position X' is a post-change inspection position. Furthermore, the inspection route R is updated by replacing the change target inspection position X with this inspection position, and the posture P is updated by setting a posture at this inspection position as the candidate posture P'. Consequently, it is possible to determine the post-change position and posture of the imaging unit 210 with respect to the change target inspection position X, and update the inspection route R and the posture P to achieve the shortest inspection time while maintaining inspection accuracy.

In step S408, the inspection route R and the posture P updated in step S407 are output as the inspection route R and the posture P changed by the inspection route change processing. When contents of the output information 135 stored in the storage unit 130 is updated based on the information output at this time, the post-change inspection route R and posture P are reflected in the inspection route generation device 100A. Note that the storage unit 130 may hold both of information of the pre-change inspection route R and posture P, and information of the post-change inspection route R and posture P.

According to the above-described second embodiment of the present invention, following functions and effects are further achieved in addition to (1) to (5) described in the first embodiment.

(6) The inspection route generation device 100A includes the route change unit 151 which changes an inspection route determined by the route determination unit 141. The storage unit 130 stores the inspection target information 132 which indicates a shape of an inspection target. The route change unit 151 calculates based on the inspection target information 132 an inspectable area which indicates an area of the inspection target which the external appearance inspection device 200 can inspect when the inspection route is changed (steps S405 and S406), and determines the post-change inspection route based on the calculated inspectable area (step S407). Thus, it is possible to change an inspection route which is determined once while suppressing a decrease in inspection accuracy for the external appearance inspection device 200 which performs external appearance inspection on an inspection target.

(7) The route change unit 151 selects one of the plurality of inspection positions as the change target inspection position X (step S403), and changes the inspection route by changing at least one of the position and the posture of the imaging unit 210 at the selected change target inspection position X (step S404). Thus, it is possible to appropriately change the inspection route by making use of the original inspection route to some extent.

(8) When at least one of the position and the posture of the imaging unit 210 is changed at the change target inspection position X, the route change unit 151 calculates the movement cost C' which is based on a route length between respective inspection positions, and the posture change amount and the traveling direction of the imaging unit 210 at a time when the imaging unit 210 moves through the plurality of inspection positions in the inspection route R, and the inspectable area A' (step S406), determines the post-change position and posture of the imaging unit 210 with respect to the change target inspection position X based on the calculated movement cost C' and inspectable area A', and determines the post-change inspection route R based on the determined post-change position and posture of the imaging unit 210 (step S407). More specifically, the plurality of candidate positions X' is set near the change target inspection position X (step S404), and the candidate position X' at which the inspectable area A' is not reduced and the movement cost C' is minimized among the plurality of set candidate positions X' is determined as the post-change position of the imaging unit 210 with respect to the change target inspection position X (step S407). Thus, it is possible to determine the post-change inspection route R to achieve the shortest inspection time while maintaining inspection accuracy.

(9) The route change unit 151 may select the change target inspection position X based on the information input from the user in step S403. By so doing, the user can arbitrarily select the change target inspection position X, and change the inspection route.

Each of the above-described embodiments and various modified examples are only exemplary embodiments, and the present invention is not limited to these items of contents as long as features of the invention are not undermined. Furthermore, although the various embodiments and modified examples have been described above, the present invention is not limited to these items of contents. Other aspects which are conceivable within the scope of the technical idea of the present invention are also included in the scope of the present invention.

REFERENCE SIGNS LIST

100, 100A inspection route generation device
110 input device
120 output device
130 storage unit
131 inspection device configuration information
132 inspection target information
133 inspection condition information
134 route graph information
135 output information
140, 140A computation device
141 route determination unit
142 inspectable area calculation unit
143 camera movable range calculation unit
144 route graph generation unit
145 movement cost calculation unit
146 minimum cost route selection unit
147 output information generation unit
151 route change unit
152 change target inspection position selection unit
153 candidate position setting unit
154 candidate position selection unit
200 external appearance inspection device
210 imaging unit
220 robot unit
230 computation processing unit
300 communication line
1310 robot configuration information
1311 inspection equipment configuration information
1320 shape information
1321 inspection target area information
1330 inspection position information
1331 inspectable area information
1332 camera movable range information
1340 inter-node connection information
1341 movement cost information
1350 inspection route information
1351 camera angle information
1352 robot posture information

The invention claimed is:

1. An inspection route generation device which generates an inspection route of an external appearance inspection device which performs external appearance inspection on an inspection target based on an image imaged by an imaging device, the inspection route generation device comprising a processor, a memory, and an interface, the processor configured to perform:

a storage function which stores inspection position information indicating a plurality of inspection positions at which the imaging device images the inspection target, and inspection device configuration information indicating a configuration of the external appearance inspection device; and a route determination function which calculates a route length between respective inspection positions, and a posture change amount of the imaging device at a time when the imaging device moves through the plurality of inspection positions, based on the inspection position information and the inspection device configuration information, and determines the inspection route based on the calculated route length and posture change amount, wherein the external appearance inspection device includes the imaging device and a robot unit having the imaging device attached to a distal end thereof, the robot unit is configured by combining a plurality of joints rotatable along a predetermined rotation direction and links connecting the joints, and the position and posture of the imaging device can be controlled by adjusting an angle of each joint, and the inspection device configuration information includes:

robot configuration information representing information on a shape of each link of the robot unit, an angle range of each joint, and a limit speed, and inspection facility configuration information representing an arrangement of the imaging device and the robot unit in the external appearance inspection device, the robot unit controlled based upon at least the inspection device configuration information, wherein the route determination function calculates a range of a posture in which the robot unit can be positioned at each inspection position on the basis of the inspection position information and the robot configuration information and the inspection facility configuration information included in the inspection device configuration information, calculates a movable range of the imaging device at each inspection position as a constraint condition of the posture of the imaging device on the basis of the calculated range of the posture at each inspection position, calculates the amount of change in the posture on the basis of the calculated constraint condition, calculates a movement cost on the basis of a route length between inspection positions when the imaging device moves among the plurality of inspection positions, the amount of change in the posture of the imaging device, and a traveling direction, and determines the inspection route on the basis of the calculated movement cost, and wherein a change amount of a rotation angle of the imaging device in a predetermined direction between respective inspection positions of the determined inspection route is minimized;

wherein the inspection route generation device selects a combination of rotation angles of the imaging device at each inspection position so as to minimize the amount of change in the rotation angle of the imaging unit in a predetermined direction between each inspection position of the determined inspection path.

2. The inspection route generation device according to claim 1, further comprising a route change device which changes the inspection route determined by the route determination device, wherein the storage device stores inspection target information indicating a shape of the inspection target, and the route change device calculates, based on the inspection target information, an inspectable area which indicates an area of the inspection target which the external appearance inspection device can inspect when the inspection route is changed, and determines the post-change inspection route based on the calculated inspectable area.

3. The inspection route generation device according to claim 2, wherein the route change device selects one of the plurality of inspection positions as a change target inspection position, and changes at least one of a position and a posture of the imaging device at the selected change target inspection position to change the inspection route.

4. The inspection route generation device according to claim 3, wherein the route change device calculates the movement cost and the inspectable area in a case where at least one of the position and the posture of the imaging device is changed at the change target inspection position, the movement cost being based on a route length between the respective inspection positions, and the posture change amount and a traveling direction of the imaging device at the time when the imaging device moves through the plurality of inspection positions, determines the post-change position and posture of the imaging device with respect to the change target inspection position based on the calculated movement cost and inspectable area, and determines the post-change inspection route based on the determined post-change position and posture of the imaging device.

5. The inspection route generation device according to claim 4, wherein the route change device sets a plurality of candidate positions near the change target inspection position, and determines a candidate position as the post-change position of the imaging device with respect to the change target inspection position, the candidate position being a candidate position at which the inspectable area is not reduced and the movement cost is minimized among the plurality of set candidate positions.

6. The inspection route generation device according to claim 3, wherein the route change device selects the change target inspection position based on information input from a user.

7. The inspection route generation device according to claim 1, wherein the route determination device generates a plurality of candidates of the inspection route, excludes, from the plurality of generated candidates of the inspection route, a candidate of the inspection route in which a posture change amount of the imaging device between arbitrary inspection positions is a predetermined threshold or more, and determines the inspection route.

8. An inspection route generation method for generating an inspection route of an external appearance inspection device which performs external appearance inspection on an inspection target based on an image imaged by an imaging device, the inspection route generation method comprising:

providing a computation device including a processor, a memory, and a storage; and executing the following at the computation device:

processing of acquiring inspection position information indicating a plurality of inspection positions at which the imaging device images the inspection target, and inspection device configuration information indicating a configuration of the external appearance inspection device;

processing of calculating a route length between respective inspection positions, and a posture change amount of the imaging device at a time when the imaging device moves through the plurality of inspection positions, based on the acquired inspection position information and inspection device configuration information; and processing of determining the inspection route based on the calculated route length and posture change amount, wherein the external appearance inspection device includes the imaging device and a robot unit having the imaging device attached to a distal end thereof, the robot unit is configured by combining a plurality of joints rotatable along a predetermined rotation direction and links connecting the joints, and the position and posture of the imaging device can be controlled by adjusting an angle of each joint, and the inspection device configuration information includes:

robot configuration information representing information on a shape of each link of the robot unit, an angle range of each joint, and a limit speed, and inspection facility configuration information representing an arrangement of the imaging device and the robot unit in the external appearance inspection device, the robot unit controlled based upon at least the inspection device configuration information, wherein the processing of determining the inspection route calculates a range of a posture in which the robot unit can be positioned at each inspection position on the basis of the inspection position information and the robot configuration information and the inspection facility configuration information included in the inspection device configuration information, calculates a movable range of the imaging device at each inspection position as a constraint condition of the posture of the imaging device on the basis of the calculated range of the posture at each inspection position, calculates the amount of change in the posture on the basis of the calculated constraint condition, calculates a movement cost on the basis of a route length between inspection positions when the imaging device moves among the plurality of inspection positions, the amount of change in the posture of the imaging device, and a traveling direction, and determines the inspection route on the basis of the calculated movement cost, and wherein a change amount of a rotation angle of the imaging device in a predetermined direction between respective inspection positions of the determined inspection route is minimized;

processing of selecting a combination of rotation angles of the imaging device at each inspection position so as to minimize the amount of change in the rotation angle of the imaging unit in a predetermined direction between each inspection position of the determined inspection path.

9. The inspection route generation method according to claim 8, further comprising, executing at the computation device:

processing of acquiring inspection target information indicating a shape of the inspection target;

processing of calculating, based on the acquired inspection target information, an inspectable area which indicates an area of the inspection target which the external appearance inspection device can inspect when the inspection route is changed; and processing of changing the inspection route by determining the post-change inspection route based on the calculated inspectable area.

10. The inspection route generation method according to claim 9, wherein, in the processing of changing the inspection route, one of the plurality of inspection positions is selected as a change target inspection position, and at least one of a position and a posture of the imaging device is changed at the selected change target inspection position to change the inspection route.

11. The inspection route generation method according to claim 10, further comprising, executing at the computation device, processing of calculating the movement cost in a case where at least one of the position and the posture of the imaging device is changed at the change target inspection position, the movement cost being based on a route length between the respective inspection positions, and the posture change amount and a traveling direction of the imaging device at the time when the imaging device moves through the plurality of inspection positions; and processing of calculating the inspectable area, wherein, in the processing of changing the inspection route, the post-change position and posture of the imaging device with respect to the change target inspection position is determined based on the calculated movement cost and inspectable area, and the post-change inspection route is determined based on the determined post-change position and posture of the imaging device.

12. The inspection route generation method according to claim 11, wherein in the processing of calculating the movement cost and the processing of calculating the inspectable area, a plurality of candidate positions is set near the change target inspection position, and the movement cost and the inspectable area respectively are calculated, and in the processing of changing the inspection route, a candidate position is determined as the post-change position of the imaging device with respect to the change target inspection position, the candidate position being a candidate position at which the inspectable area is not reduced and the movement cost is minimized among the plurality of set candidate positions.

13. The inspection route generation method according to claim 10, wherein, in the processing of calculating the inspectable area, information input from a user is acquired, and the change target inspection position is selected based on the acquired information.

14. The inspection route generation method according to claim 8, wherein, in the processing of determining the inspection route, a plurality of candidates of the inspection route is generated, a candidate of the inspection route in which a posture change amount of the imaging device between arbitrary inspection positions is a predetermined threshold or more is excluded from the plurality of generated candidates of the inspection route, and the inspection route is determined.

* * * * *